United States Patent [19]
Takeo et al.

[11] Patent Number: 5,157,733
[45] Date of Patent: Oct. 20, 1992

[54] RADIATION IMAGE PROCESSING APPARATUS, DETERMINATION APPARATUS, AND RADIATION IMAGE READ-OUT APPARATUS

[75] Inventors: Hideya Takeo, Kanagawa; Kazuhiro Hishinuma, Tokyo; Kazuo Shimura, Kanagawa; Nobuyoshi Nakajima, Kanagawa; Shoji Hara, Kanagawa; Hiroshi Tanaka; Takefumi Nagata, both of Tokyo, all of Japan

[73] Assignee: Fuji Photo Film Co., Ltd., Kanagawa, Japan

[21] Appl. No.: 712,214

[22] Filed: Jun. 7, 1991

[30] Foreign Application Priority Data

| Jun. 8, 1990 | [JP] | Japan | 2-151040 |
| Jun. 26, 1990 | [JP] | Japan | 2-167514 |
| Aug. 22, 1990 | [JP] | Japan | 2-220491 |
| Sep. 10, 1990 | [JP] | Japan | 2-239470 |
| Sep. 10, 1990 | [JP] | Japan | 2-239471 |

[51] Int. Cl.$^5$ .............................................. G06K 9/00
[52] U.S. Cl. .................................... 382/6; 382/14; 382/15; 364/413.13
[58] Field of Search ........................ 382/6, 14, 15; 364/413.13, 274.9, 972.4; 250/327.2 C, 327.2 G, 484.1; 395/21

[56] References Cited

U.S. PATENT DOCUMENTS

| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,638,162 | 1/1987 | Tanaka et al. | 250/327.2 |
| 4,876,731 | 10/1989 | Loris et al. | 395/21 |
| 4,928,011 | 5/1990 | Shimura | 250/327.2 G |
| 4,955,067 | 9/1990 | Shimura | 382/6 |
| 4,963,739 | 10/1990 | Hishinuma | 250/327.2 G |
| 4,994,662 | 2/1991 | Funahashi et al. | 250/327.2 G |
| 4,999,497 | 3/1991 | Funahashi et al. | 250/327.2 G |
| 5,048,095 | 10/1991 | Bhanu et al. | 382/15 |

FOREIGN PATENT DOCUMENTS 56-11395 2/1981 Japan .

OTHER PUBLICATIONS

"Learning representations by back-propagating errors"(D. E. Rumelhart, G. E. Hinton and R. J. Williams, Nature, 323–329, 533–536, 1986a).

"Learning Internal Representations by Error Propagation," Parallel Distributed Processing Chapter 8 (D. E. Rumelhart, G. E. Hinton and R. J. Williams, vol. 1, MIT Press, 1986b).

*Primary Examiner*—Jose Couso
*Attorney, Agent, or Firm*—Sughrue, Mion, Zinn, Macpeak & Seas

[57] ABSTRACT

In a radiation image processing apparatus, signal processing for determining the shape and location of an irradiation field, adjusting read-out conditions for a final readout from a preliminary read-out image signal, adjusting image processing conditions, and/or detecting an abnormal pattern is carried out on an image signal representing a radiation image by using a neural network. After the neural network, the learning operations of which have been carried out, is incorporated into the radiation image processing apparatus, modifying information is entered from an input device into the neural network. The modifying information is used to modify the signal processing carried out by the neural network and thereby to carry out re-learning operations of the neural network.

33 Claims, 12 Drawing Sheets

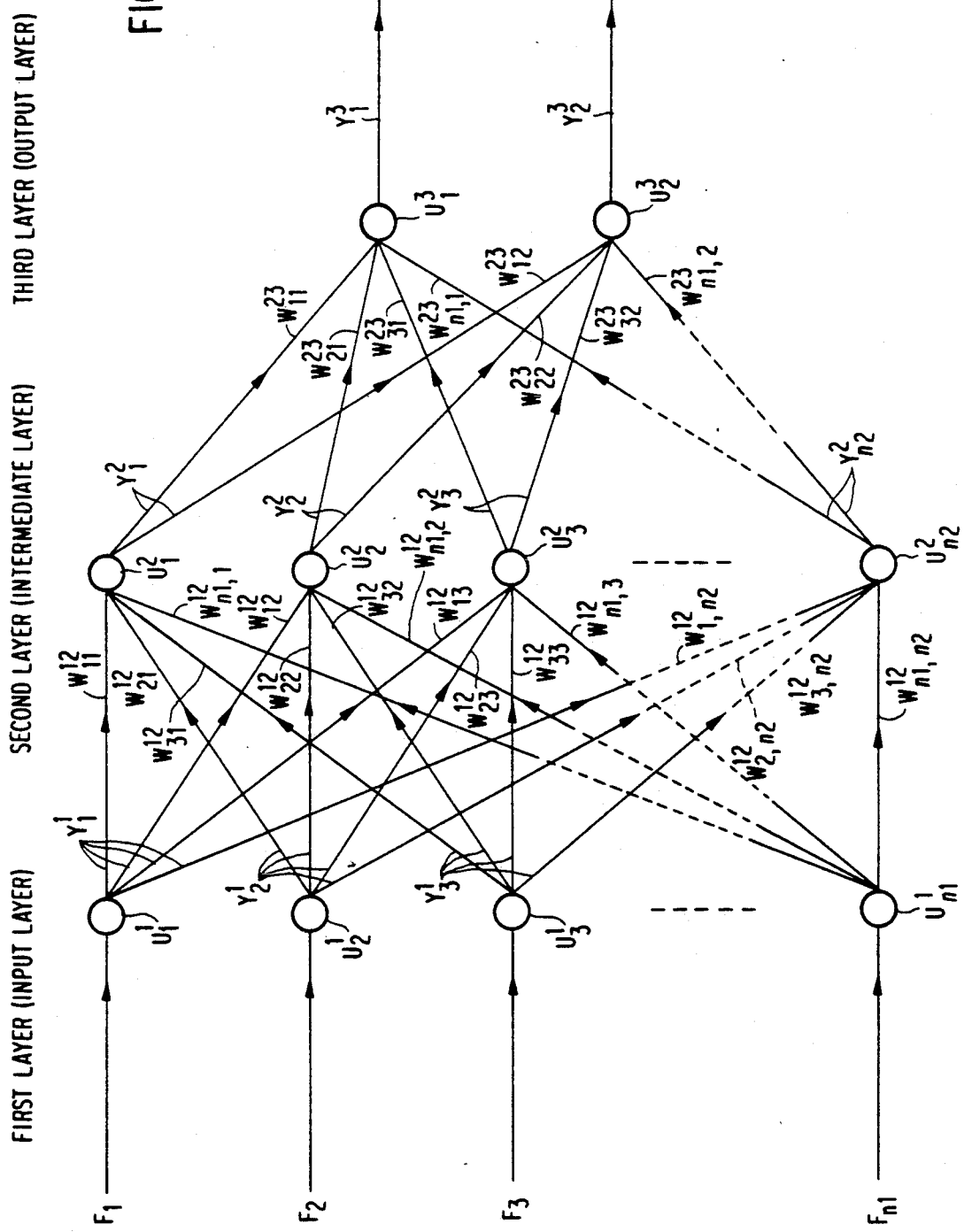

| INPUT SIGNALS $(F_1, F_2, F_3, \ldots F_n)$ | INSTRUCTOR SIGNALS $(\widetilde{y}_1^3, \widetilde{y}_2^3)$ |
|---|---|
| INPUT 1 | OUTPUT 1 |
| INPUT 2 | OUTPUT 2 |
| INPUT 3 | OUTPUT 3 |
| INPUT n | OUTPUT n |

RADIATION IMAGE PROCESSING APPARATUS, DETERMINATION APPARATUS, AND RADIATION IMAGE READ-OUT APPARATUS

BACKGROUND OF THE INVENTION

1. Field of the Invention

This invention relates to a radiation image processing apparatus, wherein signal processing for determining the shape and location of an irradiation field, adjusting read-out conditions for a final readout from a preliminary read-out image signal, adjusting image processing conditions, and/or detecting an abnormal pattern is carried out on an image signal representing a radiation image by using a neural network. This invention also relates to a determination apparatus, which is provided with a neural network having a learning function by a back propagation method and which determines a certain item. This invention further relates to a radiation image read-out apparatus for reading out a radiation image from a recording medium, such as a stimulable phosphor sheet, on which the radiation image of an object has been recorded, and thereby obtaining an image signal representing the radiation image.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph, or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed. The proposed radiation image recording and reproducing systems are constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (including the preliminary read-out image signal) obtained and to adjust the image processing conditions, which are to be used when the image signal is processed, on the basis of the results of an analysis of the image signal. The term "image processing conditions" as used herein means a group of various factors, which are adjustable and set when an image signal is subjected to processing, which affect the gradation, sensitivity, or the like, of a visible image reproduced from the image signal. The proposed method is applicable to cases where an image signal is obtained from a radiation image recorded on a recording medium such as conventional X-ray film, as well as to systems using stimulable phosphor sheets.

As disclosed in, for example, U.S. Pat. No. 4,638,162 and Japanese Unexamined Patent Publication No. 61(1986)-280163, operations for calculating the values of the read-out conditions for the final readout and/or the image processing conditions are carried out by a group of algorithms which analyze an image signal (or a preliminary read-out image signal). A large number of image signals detected from a large number of radiation calculate the read-out conditions for the final readout and/or the image processing conditions are designed on the basis of the results obtained from this processing.

In general, the algorithms which have heretofore been employed are designed such that a probability density function of an image signal is created, and characteristic values are found from the probability density function. The characteristic values include, for example, the maximum value of the image signal, the minimum value of the image signal, or the value of the image signal at which the probability density function is maximum, i.e. the value which occurs most frequently. The read-out conditions for the final readout and/or the image processing conditions are determined on the basis of the characteristic values.

Recently, a method for utilizing a neural network, which is quite different from the algorithms described above, has been proposed.

The neural network is provided with a learning function by back propagation method. Specifically, when information (an instructor signal), which represents whether an output signal obtained when an input signal is given is or is not correct, is fed into the neural network, the weight of connections between units in the neural network (i.e. the weight of synapse connections) is corrected. By repeating the learning of the neural network, the probability that a correct answer will be obtained in response to a new input signal can be kept high. (Such functions are described in, for example, "Learning representations by back-propagating errors" by D. E. Rumelhart, G. E. Hinton and R. J. Williams, Nature, 323-9,533-356, 1986a; "Back-propagation" by Hideki Aso, Computrol, No. 24, pp. 53-60; and "Neural Computer" by Kazuyuki Aihara, the publishing bureau of Tokyo Denki University).

The neural network is also applicable when the read-out conditions for the final readout and/or the image processing conditions are to be adjusted. By feeding an image signal, or the like, into the neural network, outputs representing the values of the read-out conditions for the final readout and/or the image processing conditions can be obtained from the neural network.

Also, recently, in the radiation image recording and reproducing systems which use X-ray film or stimulable phosphor sheets, particularly in such radiation image recording and reproducing systems designed to facilitate medical diagnoses, not only have image signals been processed in ways which ensure that the visible images produced from them will be of high quality, but image signals have also been processed in ways which allow certain image patterns to be extracted from radiation images. One type of processing which results in extraction of an image pattern is disclosed in, for example, Japanese Unexamined Patent Publication No. 62(1987)-125481.

Specifically, an image pattern can be detected in a complicated radiation image by processing the image signal representing it in various ways. The image signal is made up of a series of image signal components, and with appropriate processing the image signal components corresponding to a particular image pattern can be found. For example, from a very complicated radiation image, such as an X-ray image of the chest of a human body, which includes various linear and circular patterns, a pattern corresponding to a tumor, or the like, can be detected.

After a pattern, for example, a tumor pattern, is detected in a complicated radiation image, such as an X-ray image of the chest of a human body, a visible image is reproduced and displayed such that the detected pattern can be viewed clearly. Such a visible image can serve as an effective tool in, particularly, the efficient and accurate diagnosis of an illness.

When the neural network is utilized to adjust the read-out conditions for the final readout and/or the image processing conditions, by repeating the learning of the neural network, the read-out conditions for the final readout and/or the image processing conditions appropriate for a specific radiation image can be determined. However, in a single system for processing X-ray images of, for example, the shoulder of a human body, various types of image signals are obtained which represent various radiation images, such as the images of the right shoulder and the left shoulder (reversed images), an enlarged image and a reduced image, an erect image and a side image and an inverted image, and images shifted from each other. In order for a neural network to be constructed which can determine the read-out conditions for the final readout and/or the image processing conditions appropriate for each of various such images, a very large number of units should be incorporated in the neural network. Also, a storage means should be used which has a very large capacity for storing information representing the weight of connections between units in the neural network. Additionally, the learning of the neural network should be repeated very many times.

In view of the above circumstances, in U.S. patent application Ser. No. 687,140, the applicant proposed an apparatus for adjusting read-out conditions and/or image processing conditions for a radiation image wherein, even if various image signals representing various radiation images are obtained, the read-out conditions for the final readout and/or the image processing conditions appropriate for each of the various radiation images are determined by a neural network provided with a comparatively small number of units.

Specifically, as an apparatus which is applicable when a stimulable phosphor sheet is used and the preliminary readout is carried out, the applicant proposed an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:
i) a storage means for storing information representing a standard pattern of radiation images,
ii) a signal transforming means for transforming said first image signal representing said radiation image into a transformed image signal representing the radiation image, which has been transformed into said standard pattern, and
iii) a condition adjusting means provided with a neural network, which receives said transformed image signal and feeds out information representing the read-out conditions and/or the image processing conditions.

Also, as an apparatus which is applicable when a stimulable phosphor sheet and other recording media are used and the image processing conditions are adjusted, the applicant proposed an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:
i) a storage means for storing information representing a standard pattern of radiation images,
ii) a signal transforming means for transforming said image signal representing said radiation image into a transformed image signal representing the radiation image, which has been transformed into said standard pattern, and
iii) a condition adjusting means provided with a neural network, which receives said transformed image signal and feeds out information representing the image processing conditions.

However, radiation images of, for example, human bodies have very complicated configurations. Therefore, particularly for radiation images to be used in making diagnoses, it often occurs that users, e.g. physicians, want to correct the read-out conditions for the final readout and/or the image processing conditions, which have been determined by the neural network after its learning operations have been carried out. In such cases, after the neural network is located in a hospital, or the like, it is desired that re-learning operations of the neural network be carried out.

As for abnormal pattern detecting apparatuses, Japanese Unexamined Patent Publication No. 62(1987)-25481 discloses an apparatus wherein an image signal representing an X-ray image of the chest of a human body, or the like, is processed with a specific filter, which does not change with positions in the X-ray image, and a circular pattern and a linear pattern are thereby detected. The detected circular pattern is displayed as a prospective tumor pattern, and the detected linear pattern is displayed as a blood vessel pattern.

However, radiation images of human bodies have very complicated configurations. For example, a tumor pattern appearing in close proximity to a rib pattern and a tumor pattern appearing at an intermediate position between two rib patterns in an X-ray image of the chest of a human body will be different from each other. Therefore, with the aforesaid conventional abnormal pattern detecting apparatus having a simple configuration, the problem occurs in that all of tumor patterns, which are present in an X-ray image, cannot be found accurately. Also, the problem occurs in that a pattern, which does not actually correspond to a tumor, is found by mistake as a tumor pattern. After an image pattern is detected and a visible image showing the detected image pattern is reproduced in, for example, a radiation image recording and reproducing system designed to facilitate medical diagnoses, a physician will base his diagnosis primarily on how the detected pattern looks. If a certain pattern (a certain tumor pattern) is not detected accurately, a physician may fail to find a tumor. This is a very serious problem in making diagnoses.

In order for the aforesaid problem to be eliminated, the filter, which is used to process an image signal representing a radiation image, or the like, may be designed such that all of patterns, which are at least considered as being prospective tumor patterns, can be detected. However, if all of patterns, which are at least considered as being prospective tumor patterns, are detected, patterns (noise) which do not actually correspond to tumors will also be detected as tumor patterns. Therefore, the reliability of the automatic image finding systems becomes bad, and the efficiency of diagnoses cannot be kept high.

Heretofore, in cases where no system for automatically finding the images is available, physicians, who make diagnoses from X-ray images of the chests of human bodies, which images are recorded on, for example, sheets of X-ray film, have considerably accurately detected tumor patterns, from their knowledge and experience, even when the tumor patterns are present at various positions in an X-ray image and are slightly deformed.

Also, even if the same types of image forming and viewing systems are used, it will often occur that the mean-level characteristics of the images to be processed vary for different locations of the image forming and viewing systems, or the like. It will also occur that the results of a judgment made from an image vary slightly for different persons who view the image. For example, when X-ray image recording and diagnostic systems for X-ray images of the chests of human bodies are used, the energy distribution and the dose of X-rays employed in image recording operations vary for different hospitals, in which the X-ray image recording and diagnostic systems are located. In such cases, slightly different X-ray images of the chests will be formed in different hospitals. Also, when a diagnosis is made from a reproduced visible X-ray image of the chest, the results of the judgment as to whether the chest is normal or is to be re-examined will vary for different physicians who view the X-ray image.

Therefore, in the systems for automatically finding the images, by utilizing knowledge and experience, a higher level of processing than the simple filtering processing of an image signal representing an image should be carried out such that patterns which do not actually correspond to tumors, or the like, may be eliminated as much as possible from the patterns, which have been found at least as being prospective tumor patterns, or the like. Also, by accumulating the knowledge in accordance with the locations of the systems for automatically finding the images and persons who view the images, the systems for automatically finding the images should be modified through re-learning operations such that the systems become more suitable for the users.

Methods for carrying out an operation (hereinafter referred to as an EDR) for calculating the values of the read-out conditions for the final readout and/or the image processing conditions from an image signal (or a preliminary read-out image signal) have the problems described below. Specifically, the EDR is carried out automatically by a group of algorithms which analyze the image signal. The selection of which algorithms are appropriate for a specific image signal depends on the characteristics of the recorded image. Such characteristics include, for example, what portion of an object is represented by the recorded image (e.g., the head, the chest or the abdomen in cases where the object is a human body) and what mode was used when the image was recorded (e.g., an ordinary image recording mode, a contrasted image recording mode or an enlarged image recording mode). A large number of image signals detected from a large number of radiation images are statistically processed and classified according to the characteristics of the recorded images, such as those characteristics mentioned above. The algorithms which calculate the read-out conditions for the final readout and/or the image processing conditions are designed on the basis of the results obtained from this processing.

However, because the algorithms selected for an EDR are designed on the basis of the results of the statistical processing of a large number of image signals as described above, the algorithms cannot be appropriate for all radiation images, even though they are selected on the basis of specific characteristics of a recorded image. In cases where an unsuitable EDR is carried out on an image signal, a visible image having a density and latitude which make it unsuitable for viewing purposes is obtained when the visible image is reproduced from the image signal detected from the radiation image. In the worst case, a visible image which cannot provide the necessary information about a radiation image is obtained, and the image must be rerecorded. Also, in cases where the object is a human body, the radiation dose to the human body is doubled when the recording of the image is repeated. This problem should be avoided because radiation is harmful to the human body.

Examples of cases where the aforesaid problems arise will be described hereinbelow.

One of the characteristics of a recorded image which should be considered when selecting the algorithms for an EDR is that unnecessary portions of an object may be recorded on a recording medium when scattered radiation impinges upon those portions. Also, radiation may impinge directly upon a portion of a recording medium without being passed through or reflected by an object. In this manner, an image signal picks up unnecessary components which must be removed in order for an image signal representing only the desired portions of a radiation image to be obtained.

FIGS. 13A and 13B are graphs showing probability density functions of preliminary read-out image signals SP detected by preliminary readouts carried out on two stimulable phosphor sheets.

FIG. 13A shows an example of the probability density function of a preliminary read-out image signal SP detected from a radiation image for which an EDR is suitable and which is of the type accounting for most (for example, 99.5%) radiation images.

With reference to FIG. 13A, the values of the preliminary read-out image signal SP, which were obtained by detecting the light emitted by a stimulable phosphor sheet during a preliminary readout and which are proportional to the amount of light emitted, are plotted on the horizontal axis, which has a logarithmic scale. The relative frequency of occurrence of the values of the preliminary read-out image signal SP is plotted on the vertical axis at the upper part of the graph, and the values of the image signal obtained during the final readout are plotted on a logarithmic scale on the vertical axis at the lower part of the graph. In this case, the probability density function of the preliminary read-out image signal SP is composed of projecting parts A, B, and C, and it is assumed that the projecting part B corresponds to the part of a radiation image which it is necessary to reproduce. By way of example, in order for the projecting part B to be found, values of the probability density function are compared to a predetermined threshold value T, starting with the value of the function at the minimum value SL of the preliminary read-out image signal SP and working along the direction of increase of the image signal values, i.e. along the chained line. When the probability density function crosses through the threshold value T, a calculation is made to find out whether the function is rising or falling. In this manner, a second rising point "a" and a second falling point "b" are found. The maximum and minimum values of the preliminary read-out image signal at the points "b" and "a" are denoted by Smax and Smin, respectively. The read-out conditions for the final readout are set so that during the final readout the image information represented by the emitted light signal for values of the emitted light falling within the range of Smax to Smin is reproduced accurately. Specifically, the read-out conditions for the final readout are set such that Smax and Smin of the preliminary read-out image signal SP are detected respectively as the maximum image signal value Qmax and the minimum image signal value Qmin in the final readout. The maximum image signal value Qmax and the minimum image signal value Qmin in turn correspond respectively to the maximum density Dmax and the minimum density Dmin within the predetermined correct density range of the visible image ultimately reproduced. More specifically, the read-out conditions for the final read-out are set such that during the final readout the image information represented by values of the emitted light signal falling within the range of Smax to Smin is detected as an image signal with values lying on the straight line G shown in FIG. 13A.

In the manner described above, for most of the radiation images, the read-out conditions for the final readout can be adjusted appropriately. However, in some cases, the correct read-out conditions for the final readout cannot be determined with this method. One such case will be described hereinbelow.

FIG. 13B shows the probability density function of a preliminary read-out image signal SP' detected from a radiation image of an object approximate to the object, the radiation image of which yielded the probability density function shown in FIG. 13A. In the case of both FIGS. 13A and 13B, the radiation image of the objects (by way of example, the chest of a human body) were recorded under the same image recording conditions, i.e. the characteristics of the recorded images were the same.

When the probability density function shown in FIG. 13B is compared with that shown in FIG. 13A, projecting parts B' and C' approximate the projecting parts B and C, respectively. However, a projecting part A' differs from the projecting part A, in that it is divided into two projecting parts, A1' and A2'.

When the method described above is applied to the probability density function shown in FIG. 13B, the values of the probability density function are compared to the predetermined threshold value T. Starting from the values of the probability density function corresponding to the minimum value SL' of the preliminary read-out image signal SP', whenever the value of the probability density function crosses over the threshold value T, a calculation is made as to whether the function is rising or falling. In this manner, a second rising point a' and a second falling point b' are found. However, the range of the preliminary read-out image signal SP' between the points a' and b' is different and far apart from the range (of the projecting part B') corresponding to the part of the radiation image, which it is necessary to reproduce. If the final readout is carried out so that during the final readout the image information represented by an emitted light signal with values falling within the range between the points a' and b' is detected as an image signal with values lying on a straight line G', the image signal thus obtained will not contain the necessary image information, and cannot yield a useful visible image. In such cases, the recording of the radiation image of the object must be repeated.

Besides the extreme case described above, an inaccurate EDR deteriorates the image quality of a reproduced visible image.

FIG. 13C shows the probability density function of a preliminary read-out image signal SP' detected from a radiation image of an object approximate to the object, the radiation image of which yielded the probability density function shown in FIG. 13A. In the case of both FIGS. 13A and 13C, the radiation image of the objects (by way of example, the chest of a human body) were recorded under the same image recording conditions, i.e. the characteristics of the recorded images were the same.

When the probability density function shown in FIG. 13C is compared with that shown in FIG. 13A, projecting parts A' and C' approximate the projecting parts A and C, respectively. However, a projecting part B' differs from the projecting part B, in that it is divided into two projecting parts, B1' and B2'.

When the method described above is applied to the probability density function shown in FIG. 13C, the values of the probability density function are compared to the predetermined threshold value T. Starting from the values of the probability density function corresponding to the minimum value SL' of the preliminary read-out image signal SP', whenever the value of the probability density function crosses over the threshold value T, a calculation is made as to whether the function is rising or falling. In this manner, a second rising point a' and a second falling point b' are found. However, the range of the preliminary read-out image signal SP' between the points a' and b' is different from the range (of the projecting part B' composed of the projecting parts B1' and B2') corresponding to the part of the radiation image, which it is necessary to reproduce. If the final readout is carried out so that during the final readout the image information represented by an emitted light signal with values falling within the range between the points a' and b' is detected as an image signal with values lying on a straight line G', the image signal thus obtained will not contain part of the necessary image information, and cannot yield a visible image representing all of the necessary image information. In such cases, it often occurs that the recording of the radiation image of the object must be repeated.

Even if a visible image representing almost all of the necessary image information can be obtained, the problems will occur in that the image density of the visible image becomes undesirably low or high as a whole or the brightness of the visible image becomes low.

In U.S. Pat. No. 4,928,011, a novel method has been proposed to eliminate the aforesaid problems regarding an automatic EDR. With the proposed method, the read-out conditions for the final readout and/or the image processing conditions are determined automatically by the EDR, and a means is provided for manually setting or adjusting the read-out conditions for the final readout and/or the image processing conditions. By way of example, judgment criteria are predetermined, and a judgment is made as to whether the read-out conditions for the final readout and/or the image processing conditions, which have been determined by the EDR, are or are not correct. When it has been judged with the judgment criteria or by an operator that the determined read-out conditions for the final readout and/or the determined image processing conditions are not correct, correct read-out conditions for the final readout and/or correct image processing conditions are set manually. Alternatively, the read-out conditions for the final readout and/or the image processing conditions, which have been determined by the EDR, are corrected manually.

An EDR employed in a radiation image recording and reproducing system has been designed by the manufacturer of the radiation image recording and reproducing system on the basis of the results of the statistical processing of a large number of image signals detected from a large number of radiation images. However, it often occurs that a specific user uses the radiation image recording and reproducing system under specific conditions different from those anticipated by the manufacturer. For example, a certain radiation image recording and reproducing system for processing radiation images of human bodies as objects is designed in the manufacturing step such that images of the chests of human bodies are primarily processed, and the mean-level error in automatically determining the read-out conditions for the final readout and/or the image processing conditions with respect to images portions of human bodies other than the chests is larger than error in automatically determining the conditions with respect to images of the chests. However, it often occurs that a specific user processes only radiation images of the heads. Also, it often occurs that a specific user employs a radiation image recording apparatus having a large level of nonuniformity in how radiation is irradiated, and therefore large errors occur in determining read-out conditions for the final readout and/or the image processing conditions by the standard algorithms. In such cases, incorrect read-out conditions for the final readout and/or incorrect image processing conditions are frequently obtained with the automatic EDR, and therefore manual adjustments of the read-out conditions for the final readout and/or the image processing conditions must be carried out frequently. Accordingly, the radiation image recording and reproducing system becomes unsuitable for the specific user.

Also, in a radiation image recording and reproducing system designed such that a judgment is made as to whether the read-out conditions for the final readout and/or the image processing conditions, which have been automatically determined with an EDR, are or are not correct, and the conditions are manually adjusted when they are judged as being incorrect, the conditions may be judged as being correct when the values of the conditions fall within the range of, e.g. the mean value ± a predetermined value. The conditions may be judged as being incorrect when the values of the conditions go beyond this range. However, a radiation image of an object fluctuates largely in accordance with the object and the conditions under which the radiation image was recorded. Therefore, an accurate judgment cannot always be achieved with the aforesaid judgment criteria. For example, it often occurs that the read-out conditions for the final readout and/or the image processing conditions, which have been judged with the judgment criteria as being correct, are actually incorrect, or those which have been judged with the judgment criteria as being incorrect, are actually correct. One method for eliminating such problems is to select a small value as the aforesaid predetermined value such that incorrect conditions may not be judged as being correct and all of the values of the conditions, which at least has the probability of being incorrect, may be judged as being incorrect. However, with such a method, considerable time and labor are required to adjust the conditions manually, and the operating efficiency of the radiation image recording and reproducing system cannot be kept high.

SUMMARY OF THE INVENTION

The primary object of the present invention is to provide a radiation image processing apparatus, wherein read-out conditions for a final readout and/or image processing conditions are determined by a neural network after its learning operations have been carried out, the shape and location of an irradiation field are determined by the neural network, and/or an abnormal pattern is detected by the neural network, and relearning operations of the neural network can be carried out by a user after the radiation image processing apparatus provided with the neural network is located in a hospital, or the like, in cases where the results of the determination or the detection using the neural network are judged as being incorrect, such that the accuracy of the determination or the detection may be improved even further.

Another object of the present invention is to provide a determination apparatus, wherein a comparatively simple neural network is utilized, which can work under a wide variety of conditions and relearning operations of which can be carried out by a specific user in a manner appropriate for the specific user such that the neural network may become appropriate for the specific user.

A further object of the present invention is to provide a radiation image read-out apparatus, wherein a system is employed which can be modified into a system suitable for a specific user as the apparatus is operated by the specific user in a manner slightly different from a manner which the manufacturer considered as being standard.

A still further object of the present invention is to provide a radiation image read-out apparatus, wherein an accurate judgment is made as to whether read-out conditions for a final readout and/or image processing conditions, which have been determined automatically, are or are not correct.

The present invention provides a radiation image processing apparatus, wherein signal processing for determining the shape and location of an irradiation field, adjusting read-out conditions for a final readout from a preliminary read-out image signal, adjusting image processing conditions, and/or detecting an abnormal pattern is carried out on an image signal representing a radiation image by using a neural network, wherein the improvement comprises the provision of an input means for entering modifying information, which is used to modify said signal processing carried out by said neural network and thereby to carry out relearning operations of said neural network, into said neural network after said neural network, the learning operations of which have been carried out, is incorporated into the radiation image processing apparatus.

The present invention also provides an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, .

a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a storage means for storing information representing a standard pattern of radiation images, ii) a signal transforming means for transforming said first image signal representing said radiation image into a transformed image signal representing the radiation image, which has been transformed into said standard pattern, iii) a condition adjusting means provided with a neural network, which receives said transformed image signal and feeds out information representing the read-out conditions and/or the image processing conditions, iv) a display means for displaying the radiation image, which has been read out under the read-out conditions fed out of said condition adjusting means and/or image-processed under the image processing conditions fed out of said condition adjusting means, as a visible image, and v) an input means for entering correcting information, which is used to transform said visible image displayed on said display means into a more appropriate visible image, into said condition adjusting means, wherein said condition adjusting means is provided with a learning function for altering operations of said neural network, which receives said transformed image signal and feeds out information representing the read-out conditions and/or the image processing conditions, on the basis of said correcting information received from said input means.

The present invention further provides an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a storage means for storing information representing a standard pattern of radiation images, ii) a signal transforming means for transforming said image signal representing said radiation image into a transformed image signal representing the radiation image, which has been transformed into said standard pattern, iii) a condition adjusting means provided with a neural network, which receives said transformed image signal and feeds out information representing the image processing conditions, iv) a display means for displaying the radiation image, which has been image processed under the image processing conditions fed out of said condition adjusting means, as a visible image, and v) an input means for entering correcting information, which is used to transform said visible image displayed on said display means into a more appropriate visible image, into said condition adjusting means, wherein said condition adjusting means is provided with a learning function for altering operations of said neural network, which receives said transformed image signal and feeds out information representing the image processing conditions, on the basis of said correcting information received from said input means.

In the apparatus for adjusting read-out conditions and/or image processing conditions for a radiation image and the apparatus for adjusting image processing conditions for a radiation image in accordance with the present invention, no limitation is imposed on what pattern is employed as the standard pattern of radiation images. The standard pattern may be selected in accordance with the concept behind the design of the apparatuses, or the like.

Also, in the apparatus for adjusting read-out conditions and/or image processing conditions for a radiation image and the apparatus for adjusting image processing conditions for a radiation image in accordance with the present invention, no limitation is imposed on how the image signal or the first image signal representing the radiation image is transformed into a transformed image signal representing the radiation image, which has been transformed into the standard pattern. For example, the image signal or the first image signal representing the radiation image may be transformed into a transformed image signal representing the radiation image, which has been reversed, rotated, adjusted for the position, enlarged, or reduced.

The radiation image processing apparatus in accordance with the present invention is provided with the input means for entering the modifying information into the neural network after the neural network, the learning operations of which have been carried out, is incorporated into the radiation image processing apparatus. Therefore, with the radiation image processing apparatus in accordance with the present invention, in cases where the signal processing carried out by the neural network is inappropriate for a specific user, the signal processing carried out by the neural network can be modified and re-learning operations of the neural network can thereby be carried out by the specific user. Accordingly, the neural network can be modified into a neural network, which is appropriate for the specific user.

The present invention still further provides a determination apparatus for determining a certain item on the basis of an input signal, and feeding out an output signal representing the results of the determination, the determination apparatus comprising:

i) a dictionary means for storing a plurality of sets of input signals and output signals, which represents correct answers corresponding to the input signals, for a plurality of modes, ii) a retrieval means for retrieving a set, which is associated with an input signal having a high level of correlation with an input signal fed into said neural network, from said dictionary means, and iii) a learning means for carrying out learning operations of said neural network by utilizing the input signal and the output signal, which constitute said set retrieved by said retrieval means, as an input signal and an instructor signal, respectively, of said neural network.

The level of correlation between an input signal constituting a set and an input signal fed into the neural network may be found with one of various operation methods utilizing algorithms designed to find an input signal, which is approximate to the input signal fed into the neural network, from the dictionary means. For example, calculations may be made to find root-mean-square values of the input signal of the neural network and the input signals, which constitute the sets stored in the dictionary means, and a set associated with the minimum root-mean-square value may be find. Alternatively, in cases where the input signal fed into the neural network represents an image, instead of details of the image, e.g. the picture elements of the image, being taken into consideration, the rough configuration of the image may be determined with a pattern matching technique, or the like. A set having an input signal, which is associated with the rough image configuration thus determined, may then be found from the dictionary means. As another alternative, any of other operation method may be employed, with which input signals close to each other are found.

The determination apparatus in accordance with the present invention is provided with the dictionary means for storing a plurality of sets of input signals and output signals, which represents correct answers corresponding to the input signals, for a plurality of modes. An input signal is fed into the neural network, a certain item is determined on the basis of the input signal, and an output signal representing the results of the determination is fed out of the neural network. Thereafter, an input signal, which is approximate to the input signal fed into the neural network, and an output signal, which represents the correct answer corresponding to said approximate input signal, are retrieved from the dictionary means. Learning operations of the neural network are then carried out by utilizing the input signal and the output signal, which have thus been retrieved from the dictionary means, as an input signal and an instructor signal, respectively, of the neural network. Therefore, when the determination apparatus in accordance with the present invention is delivered to a specific user and operated in a specific manner, learning operations of the neural network can be continued by the specific user with respect to the specific mode of using appropriate for the specific user. In this manner, the neural network can be modified into the one appropriate for the specific user such that it may yield a more appropriate output when it is used in the specific mode. The neural network which has thus been modified need not work extensively over the whole range of its performance. Therefore, the determination apparatus in accordance with the present invention may employ a comparatively small-scaled neural network.

The present invention also provides a first radiation image read-out apparatus wherein a stimulable phosphor sheet is used and the preliminary readout is carried out.

Specifically, the present invention also provides a first radiation image read-out apparatus comprising:

i) a preliminary read-out means for exposing a stimulable phosphor sheet, on which the radiation image has been stored, to stimulating rays, which cause the stimulable phosphor sheet to emit light in proportion to the amount of energy stored thereon during its exposure to radiation, detecting the emitted, and thereby obtaining a preliminary read-out image signal representing said radiation image of said object, ii) a final read-out means for again exposing said stimulable phosphor sheet to stimulating rays, which cause said stimulable phosphor sheet to emit light in proportion to the amount of energy stored thereon during its exposure to radiation, detecting the emitted, and thereby obtaining a final read-out image signal representing said radiation image of said object, iii) an operation means provided with a neural network, which receives information based on said preliminary read-out image signal and feeds out information representing read-out conditions, under which said final read-out image signal is to be obtained, and/or image processing conditions, under which said final read-out image signal having been obtained is to be image processed, iv) a condition input means for manually entering information representing read-out conditions and/or image processing conditions, and v) a retraining means for carrying out retraining of said neural network by utilizing the information representing the read-out conditions and/or the image processing conditions, which information has been received from said condition input means, as an instructor signal, and utilizing the information based on said preliminary read-out image signal, which information corresponds to said read-out conditions and/or said image processing conditions, as an input signal.

The present invention further provides a second radiation image read-out apparatus wherein a stimulable phosphor sheet and other recording media are used and no preliminary readout is carried out.

Specifically, the present invention further provides a second radiation image read-out apparatus comprising:

i) a read-out means for reading out a radiation image of an object from a recording media, on which the radiation image has been recorded, and thereby obtaining an image signal representing said radiation image of said object, ii) an operation means provided with a neural network, which receives information based on said image signal and feeds out information representing image processing conditions, under which said image signal is to be image processed, iii) a condition input means for manually entering information representing image processing conditions, and iv) a retraining means for carrying out retraining of said neural network by utilizing the information representing the image processing conditions, which has been received from said condition input means, as an instructor signal, and utilizing the information based on said image signal, which information corresponds to said image processing conditions, as an input signal.

The term "information based on an image signal" and the term "information based on a preliminary read-out image signal" as used herein means the image signal (or the preliminary read-out image signal) itself, or a signal obtained by carrying out predetermined processing on the image signal. Said predetermined processing is not limited to a specific type of processing. By way of example, the signal obtained by carrying out predetermined processing on the image signal may be a signal, which is obtained by thinning out the image signal appropriately, or a signal representing the pattern of the probability density function of the image signal.

No limitation is imposed on in what cases the operation means is to be used to determine the read-out conditions for the final readout and/or the image processing conditions, and in what cases the condition input means is to be used to enter the read-out conditions for the final readout and/or the image processing conditions manually. For example, the read-out conditions for the final readout and/or the image processing conditions may first be determined automatically by using the operation means. A judgment may then be made on the basis of predetermined judgment criteria as to whether the read-out conditions for the final readout and/or the image processing conditions, which have been determined automatically, are or are not correct. In cases where the read-out conditions for the final readout and/or the image processing conditions have been judged as being incorrect, correct read-out conditions for the final readout and/or the image processing conditions may be entered from the condition input means, and the learning operations of the neural network may thereby be carried out. Alternatively, a judgment may be made by an operator as to whether the read-out conditions for the final readout and/or the image processing conditions are to be determined automatically by using the operation means or to be manually entered from the condition input means. When the manual entry mode is selected by the operator, the learning operations of the neural network may be carried out with the read-out conditions for the final readout and/or the image processing conditions, which are entered manually.

Conventional techniques for determining the read-out conditions for the final readout and/or the image processing conditions by finding characteristic points of a probability density function of an image signal can be replaced by the technique for carrying out the learning operations of the neural network such that the neural network may feed out correct read-out conditions for the final readout and/or correct image processing conditions when the information based on the image signal is fed into the neural network. However, even if a neural network is merely incorporated in an apparatus, such incorporation means a mere alteration of algorithms for determining the read-out conditions for the final readout and/or the image processing conditions, and particularly large effects cannot be obtained.

The first and second radiation image read-out apparatuses in accordance with the present invention are based on the characteristics that, when the learning operations of a neural network are carried out, the neural network can be modified into a more appropriate one. With the first and second radiation image read-out apparatuses in accordance with the present invention, the learning operations of the neural network are continued by utilizing the information representing the read-out conditions for the final readout and/or the image processing conditions, which information has been received from the condition input means, as an instructor signal. Therefore, as the first and second radiation image read-out apparatuses in accordance with the present invention are used by a specific user, they become more suitable for the specific user. Accordingly, even if the first and second radiation image read-out apparatuses in accordance with the present invention are used in a specific manner by the specific user and the automatic EDRs cannot work well during the initial operations, the apparatuses will gradually become more suitable for the specific user.

The present invention still further provides a third radiation image read-out apparatus wherein a stimulable phosphor sheet is used and the preliminary readout is carried out.

Specifically, the present invention still further provides a third radiation image read-out apparatus comprising:

i) a preliminary read-out means for exposing a stimulable phosphor sheet, on which the radiation image has been stored, to stimulating rays, which cause the stimulable phosphor sheet to emit light in proportion to the amount of energy stored thereon during its exposure to radiation, detecting the emitted, and thereby obtaining a preliminary read-out image signal representing said radiation image of said object, ii) a final read-out means for again exposing said stimulable phosphor sheet to stimulating rays, which cause said stimulable phosphor sheet to emit light in proportion to the amount of energy stored thereon during its exposure to radiation, detecting the emitted, and thereby obtaining a final read-out image signal representing said radiation image of said object, iii) an operation means for determining read-out conditions, under which said final read-out image signal is to be obtained, and/or image processing conditions, under which said final read-out image signal having been obtained is to be image processed, the determination being carried out from said preliminary read-out image signal, iv) a judgment means for judging whether the read-out conditions and/or the image processing conditions, which have been determined by said operation means, are or are not correct, and v) an input means for entering information representing the correctness or incorrectness of the read-out conditions and/or the image processing conditions, which have been determined by said operation means, wherein said judgment means is provided with a neural network, which receives information based on said preliminary read-out image signal and information representing the read-out conditions and/or the image processing conditions determined by said operation means, feeds out information representing the results of the judgment as to whether the read-out conditions and/or the image processing conditions determined by said operation means are or are not correct, and utilizes the information representing the correctness or incorrectness of the read-out conditions and/or the image processing conditions, the information having been received from said input means, as an instructor signal.

The present invention also provides a fourth radiation image read-out apparatus wherein a stimulable phosphor sheet and other recording media are used and no preliminary readout is carried out.

Specifically, the present invention also provides a fourth radiation image read-out apparatus comprising:

i) a read-out means for reading out a radiation image of an object from a recording media, on which the radiation image has been recorded, and thereby obtaining an image signal representing said radiation image of said object, ii) an operation means for determining image processing conditions, under which said image signal is to be image processed, from said image signal, iii) a judgment means for judging whether the image processing conditions, which have been determined by said operation means, are or are not correct, and iv) an input means for entering information representing the correctness or incorrectness of the image processing conditions, which have been determined by said operation means, wherein said judgment means is provided with a neural network, which receives information based on said image signal and information representing the image processing conditions determined by said operation means, feeds out information representing the results of the judgment as to whether the image processing conditions determined by said operation means are or are not correct, and utilizes the information representing the correctness or incorrectness of the image processing conditions, the information having been received from said input means, as an instructor signal.

The information representing the correctness or incorrectness of the read-out conditions and/or the image processing conditions and the information representing the correctness or incorrectness of the image processing conditions may directly or indirectly represent whether the read-out conditions and/or the image processing conditions, which have been determined by the operation means, are or are not correct. By way of example, the read-out conditions for the final readout and/or the image processing conditions may be set to correct values by displaying a visible image reproduced from an image signal, which has been obtained under the read-out conditions for the final readout and/or the image processing conditions determined by the operation means, and adjusting the image density of the visible image (or the luminance of the visible image in cases where it is displayed on a CRT display device, or the like) and the contrast of the visible image. When the image density and the contrast of the visible image were changed to an extent falling within a predetermined adjustment range, it may be regarded that the information indirectly representing the correctness of the read-out conditions and/or the image processing conditions, which have been determined by the operation means, was entered. When the image density and the contrast of the visible image were changed to an extent beyond the predetermined adjustment range, it may be regarded that the information indirectly representing the incorrectness of the read-out conditions and/or the image processing conditions, which have been determined by the operation means, was entered.

Also, the input means for entering information representing the correctness or incorrectness of the read-out conditions and/or the image processing conditions, which have been determined by the operation means, and the input means for entering information representing the correctness or incorrectness of the image processing conditions, which have been determined by the operation means, may be used to enter the information representing the correctness or incorrectness of the read-out conditions for the final readout and/or the image processing conditions for all of the images. Alternatively, temporary judgment criteria may be set in advance. Only when it has been judged with the temporary judgment criteria that the read-out conditions for the final readout and/or the image processing conditions, which have been determined by the operation means, are incorrect, the input means may be used to enter information representing whether the read-out conditions for the final readout and/or the image processing conditions are actually incorrect or correct.

The conventional judgment means employing the range of mean value ± predetermined value as the judgment criteria can be replaced by the technique for utilizing the neural network. The neural network receives the information based on the image signal (or the preliminary read-out image signal) and the information representing the read-out conditions for the final readout and/or the image processing conditions, which have been determined by the operation means, and feeds out information representing whether the read-out conditions for the final readout and/or the image processing conditions are or are not correct. The learning operations of the neural network are carried out when the information representing the correctness or incorrectness of the read-out conditions for the final readout and/or the image processing conditions, which have been determined by the operation means, is received from the input means.

The information based on the image signal (or the preliminary read-out image signal) is fed into the neural network. Therefore, judgment criteria, which are more flexible than the conventional criteria, can be employed. For example, it often occurs that the read-out conditions for the final readout and/or the image processing conditions, which go beyond the range of mean value ± predetermined value, are obtained when the radiation dose employed during the image recording operation was lower than correct value. The learning operations of the neural network can be carried out so that, in such cases, the read-out conditions for the final readout and/or the image processing conditions are judged as being correct.

With the third and fourth radiation image read-out apparatuses in accordance with the present invention, the neural network is utilized to judge whether the read-out conditions for the final readout and/or the image processing conditions, which have been determined by the operation means, are or are not correct. In such cases, the accuracy with which the neural network works can be kept lower than the accuracy required for a neural network used to determine the read-out conditions for the final readout and/or the image processing conditions directly. Also, it is only necessary that the neural network feeds out a binary signal representing the correctness or incorrectness. Therefore, the scale of the neural network can be kept small. Also, only a small number of learning operations may be carried out on the neural network. Additionally, a storage device having a comparatively small storage capacity may be employed.

The present invention further provides a fifth radiation image read-out apparatus wherein a stimulable phosphor sheet is used and the preliminary readout is carried out.

Specifically, the present invention further provides a fifth radiation image read-out apparatus comprising:
 i) a preliminary read-out means for exposing a stimulable phosphor sheet, on which the radiation image has been stored, to stimulating rays, which cause the stimulable phosphor sheet to emit light in proportion to the amount of energy stored thereon during its exposure to radiation, detecting the emitted, and thereby obtaining a preliminary read-out image signal representing said radiation image of said object,
 ii) a final read-out means for again exposing said stimulable phosphor sheet to stimulating rays, which cause said stimulable phosphor sheet to emit light in proportion to the amount of energy stored thereon during its exposure to radiation, detecting the emitted, and thereby obtaining a final read-out image signal representing said radiation image of said object, iii) an operation means for determining read-out conditions, under which said final read-out image signal is to be obtained, and/or image processing conditions, under which said final read-out image signal having been obtained is to be image processed, the determination being carried out from said preliminary read-out image signal, iv) a correction means for calculating correction values for the read-out conditions and/or the image processing conditions, which have been determined by said operation means, and v) an input means for entering information representing the correction values for the read-out conditions and/or the image processing conditions, wherein said correction means is provided with a neural network, which receives information based on said preliminary read-out image signal and information representing the read-out conditions and/or the image processing conditions determined by said operation means, feeds out information representing the correction values for the read-out conditions and/or the image processing conditions determined by said operation means, and utilizes the information representing the correction values, the information having been received from said input means, as an instructor signal.

The present invention still further provides a sixth radiation image read-out apparatus wherein a stimulable phosphor sheet and other recording media are used and no preliminary readout is carried out.

Specifically, the present invention still further provides a sixth radiation image read-out apparatus comprising:

i) a read-out means for reading out a radiation image of an object from a recording media, on which the radiation image has been recorded, and thereby obtaining an image signal representing said radiation image of said object, ii) an operation means for determining image processing conditions, under which said image signal is to be image processed, from said image signal, iii) a correction means for calculating correction values for the image processing conditions, which have been determined by said operation means, and iv) an input means for entering information representing the correction values for the image processing conditions, wherein said correction means is provided with a neural network, which receives information based on said image signal and information representing the image processing conditions determined by said operation means, feeds out information representing the correction values for the image processing conditions determined by said operation means, and utilizes the information representing the correction values, the information having been received from said input means, as an instructor signal.

With the fifth and sixth radiation image read-out apparatuses in accordance with the present invention, the learning operations of the neural network are carried out such that, when the information based on the image signal (or the preliminary read-out image signal) and the information representing the read-out conditions for the final readout and/or the image processing conditions, which have been determined by the operation means, are fed into the neural network, the neural network may feed out information representing the correction values for the read-out conditions for the final readout and/or the image processing conditions, which have been determined by the operation means.

The fifth and sixth radiation image read-out apparatuses in accordance with the present invention are based on the characteristics that, when the learning operations of a neural network are carried out, the neural network can be modified into a more appropriate one. With the fifth and sixth radiation image read-out apparatuses in accordance with the present invention, the learning operations of the neural network are continued by utilizing the information representing the correction values for the read-out conditions for the final readout and/or the image processing conditions, which information has been received from the input means, as an instructor signal. Therefore, as the fifth and sixth radiation image read-out apparatuses in accordance with the present invention are used by a specific user, they become more suitable for the specific user. Accordingly, even if the fifth and sixth radiation image read-out apparatuses in accordance with the present invention are used in a specific manner by the specific user and comparatively large errors occurs in determining the read-out conditions for the final readout and/or the image processing conditions during the initial operations, the apparatuses will gradually become more suitable for the specific user.

Also, with the fifth and sixth radiation image read-out apparatuses in accordance with the present invent-ion, the neural network is utilized to determine the correction values for the read-out conditions for the final readout and/or the image processing conditions, which have been determined by the operation means. Therefore, the neural network can be kept simpler than a neural network used to determine the read-out conditions for the final readout and/or the image processing conditions directly. Also, only a small number of learning operations may be carried out on the neural network. Additionally, a storage device having a comparatively small storage capacity may be employed.

BRIEF DESCRIPTION OF THE DRAWINGS

FIG. 4 is an explanatory view showing an example of a neural network.

DESCRIPTION OF THE PREFERRED EMBODIMENTS

The present invention will hereinbelow be described in further detail with reference to the accompanying drawings.

Figure 1:
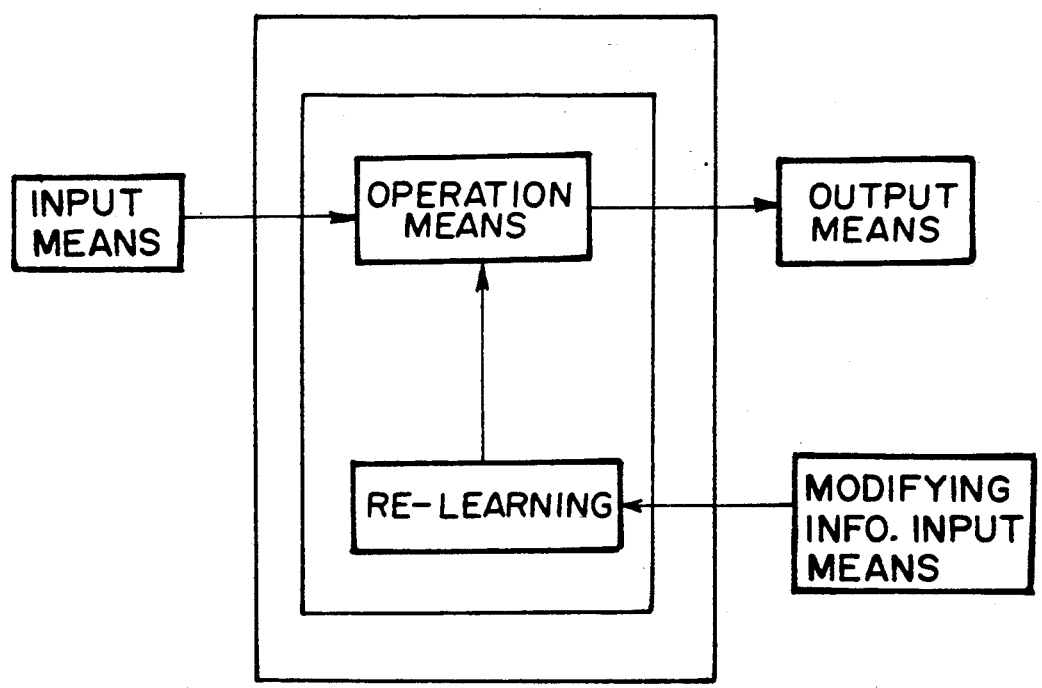
FIG. 1 is a block diagram showing an embodiment of the radiation image processing apparatus in accordance with the present invention.

FIG. 1 is a block diagram showing an embodiment of the radiation image processing apparatus in accordance with the present invention.

With reference to FIG. 1, an image signal, which represents a radiation image and which has been entered from an input means into the radiation image processing apparatus, is fed into an operation means. The operation means is provided with a neural network the learning operations of which have been carried out. In this embodiment, signal processing for determining the shape and location of an irradiation field, adjusting read-out conditions for a final readout from a preliminary read-out image signal, adjusting image processing conditions, and/or detecting an abnormal pattern is carried out on the image signal by using the neural network. An ultimate image is obtained in accordance with information representing the shape and location of the irradiation field, the read-out conditions for the final readout, the image processing conditions, and/or the abnormal pattern, which information has been obtained by the operations carried out in the operation means. An image signal representing the ultimate image is fed into an output means. A visible image is reproduced from this image signal and displayed on a display means.

A user, such as a physician, who utilizes the radiation image processing apparatus, observes the visible image. In cases where the visible image is found as being incorrect, in order for a correct visible image to be obtained, modifying information, which is used to modify the signal processing carried out by the neural network and thereby to carry out re-learning operations of the neural network, is fed by the user from the input means into the neural network.

Therefore, after the neural network has been incorporated into the radiation image processing apparatus, in cases where the signal processing carried out by the neural network is inappropriate for the user, the signal processing carried out by the neural network can be modified and re-learning operations of the neural network can thereby be carried out by the user. Accordingly, the neural network can be modified into a neural network, which is more appropriate for the user.

An embodiment of the radiation image processing apparatus in accordance with the present invention will hereinbelow be described in more detail. In the embodiment described below, an X-ray image of the shoulder of a human body is stored on a stimulable phosphor sheet.

Figure 5:
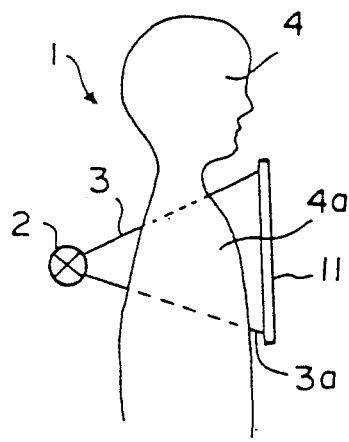
FIG. 5 is a schematic view showing an example of an X-ray image recording apparatus.

FIG. 5 is a schematic view showing an example of an X-ray image recording apparatus.

With reference to FIG. 5, X-rays 3 are produced by an X-ray source 2 of an X-ray image recording apparatus 1 and irradiated to the shoulder 4a of a human body 4. X-rays 3a, which have passed through the human body 4, impinge upon a stimulable phosphor sheet 11. In this manner, an X-ray image of the shoulder 4a of the human body 4 is stored on the stimulable phosphor sheet 11.

Figure 2A:
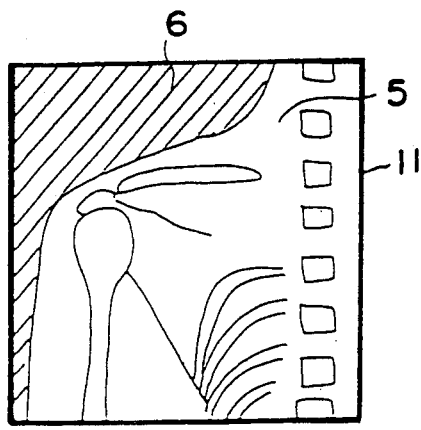
FIGS. 2A and 2B are explanatory views showing X-ray images of the right and left shoulders.
Figure 2B:
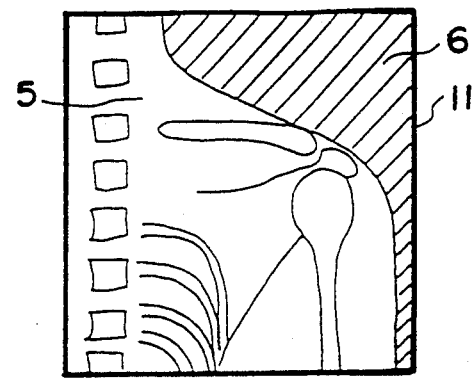

FIGS. 2A and 2B are explanatory views showing examples of X-ray images of the shoulders stored on stimulable phosphor sheets.

FIGS. 2A and 2B show the X-ray images of the right and left shoulders. Each of the X-ray images comprises an object image region 5, in which the pattern of the human body is stored, and a background region 6, upon which the X-rays impinged directly without passing through the object 4.

Figure 6:
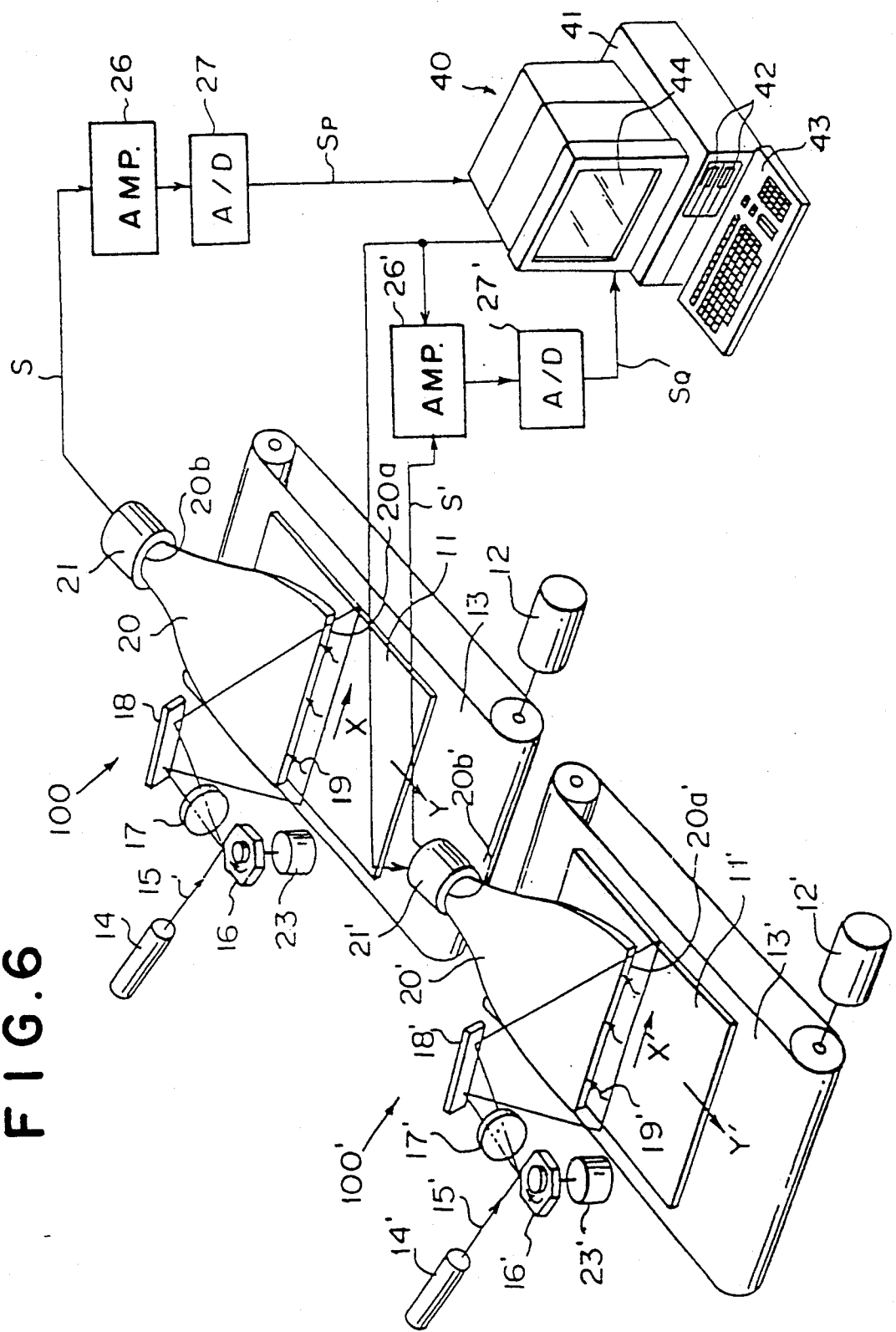
FIG. 6 is a perspective view showing an example of an X-ray image read-out apparatus and an example of a computer system, in which an embodiment of the radiation image processing apparatus in accordance with the present invention is employed.

FIG. 6 is a perspective view showing an example of an X-ray image read-out apparatus and an example of a computer system, in which an embodiment of the radiation image processing apparatus in accordance with the present invention is employed. In this embodiment, by way of example, a stimulable phosphor sheet is used, and a preliminary readout is carried out.

The stimulable phosphor sheet 11, on which the X-ray image has been stored, is placed at a predetermined position in a preliminary read-out means 100 which carries out a preliminary readout by scanning the stimulable phosphor sheet 11 with a light beam having a low energy level, thereby releasing only part of the energy from the stimulable phosphor sheet 11, which energy was stored during its exposure to radiation. The stimulable phosphor sheet 11 is conveyed in a sub-scanning direction indicated by the arrow Y by a sheet conveyance means 13 which is constituted of an endless belt or the like and which is operated by a motor 12. A laser beam 15 which has a low energy level is produced by a laser beam source 14, and is reflected and deflected by a rotating polygon mirror 16 which is quickly rotated by a motor 23 in the direction indicated by the arrow. The laser beam 15 then passes through a converging lens 17 constituted of an f$\theta$ lens or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20 and photoelectrically detected by a photomultiplier 21. The light guide member 20 is made from a light guiding material such as an acrylic plate and has a linear light input face 20a, positioned so that it extends along the main scanning line on the stimulable phosphor sheet 11, and a ring-shaped light output face 20b, positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which amount represents the X-ray image, is converted into an electric signal by the photomultiplier 21.

An analog output signal S generated by the photomultiplier 21 is logarithmically amplified by a logarithmic amplifier 26, and digitized by an A/D converter 27 into a preliminary read-out image signal SP. The preliminary read-out image signal SP takes a value proportional to the logarithmic value of the amount of the light 19, which was emitted from each of picture elements in the X-ray image stored on the stimulable phosphor sheet 11.

In the preliminary readout, read-out conditions, i.e. the voltage applied to the photomultiplier 21 and the amplification factor of the logarithmic amplifier 26, are adjusted so that image information can be detected accurately even if the amount of energy stored on the stimulable phosphor sheet 11 during its exposure to radiation varies over a wide range.

The preliminary read-out image signal SP obtained in the manner described above is fed into a computer system 40. The computer system 40 is provided with an embodiment of the radiation image processing apparatus in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

In the computer system 40, the read-out conditions for the final readout, i.e. the sensitivity and the contrast during the final readout, are determined in the manner described later. By way of example, the voltage applied to a photomultiplier 21' and the amplification factor of a logarithmic amplifier 26' are controlled in accordance with the sensitivity and the contrast.

The contrast corresponds to the ratio of the largest amount of emitted light, which is capable of being accurately converted into an image signal during the final readout, to the smallest amount of emitted light, which is capable of being accurately converted into an image signal during the final readout. The sensitivity corresponds to the photoelectric conversion factor, which represents to what image signal level a predetermined amount of emitted light is to be converted.

A stimulable phosphor sheet 11' on which the preliminary readout has been finished is placed at a predetermined position in the final read-out means 100' and scanned with a laser beam 15' having an energy level higher than that of the laser beam 15 used during the preliminary readout. In this manner, an image signal is detected under the read-out conditions which have been determined on the basis of the preliminary read-out image signal. The configuration of the final read-out means 100' is nearly the same as that of the preliminary read-out means 100, and therefore elements corresponding to those constituting the preliminary read-out means 100 are numbered with corresponding primed reference numerals in FIG. 6.

After the image signal is digitized in an A/D converter 27', the resulting image signal SQ is fed into the computer system 40, which carries out appropriate image processing on the image signal SQ. After being image processed, the image signal is fed into a reproducing apparatus (not shown), which reproduces a visible image from the image signal.

How the computer system 40 adjusts the read-out conditions for the final readout on the basis of the preliminary read-out image signal SP will be described hereinbelow.

As shown in FIGS. 2A and 2B, during the recording of X-ray images of the shoulder, the images which are reversed approximately horizontally are often obtained. In such cases, a judgment is made in the manner described below as to whether the image is of the right shoulder (FIG. 2A) or of the left shoulder (FIG. 2B). In this embodiment, the image of the right shoulder shown in FIG. 2A is taken as the standard pattern in the radiation image processing apparatus in accordance with the present invention.

Figure 3A:
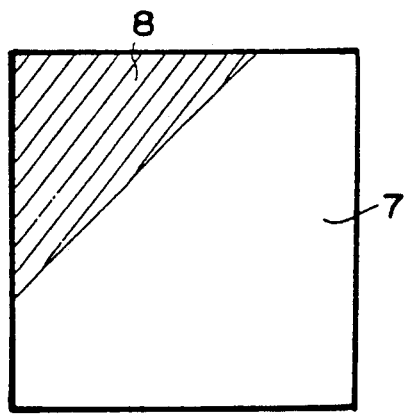
FIGS. 3A and 3B are explanatory views showing a standard pattern and a reversed pattern.
Figure 3B:
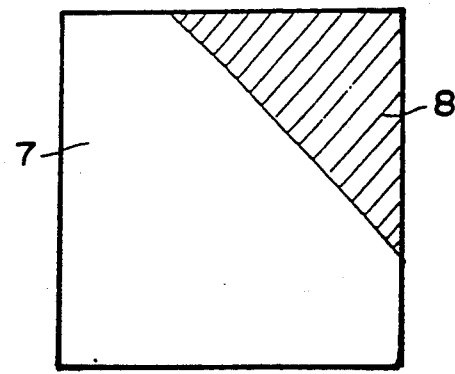

FIGS. 3A and 3B are explanatory views showing a standard pattern and a reversed pattern, which are represented by information stored in the computer system 40.

The standard pattern is composed of a first region 7, which is represented by a mean-level value of the preliminary read-out image signal SP corresponding to the object image region 5 in the X-ray image shown in FIG. 2A, and a second region 8, which is represented by a mean-level value of the preliminary read-out image signal SP detected from the background region 6 in the X-ray image shown in FIG. 2A. Also, the reversed pattern is composed of a first region 7, which is represented by a mean-level value of the preliminary read-out image signal SP corresponding to the object image region 5 in the X-ray image shown in FIG. 2B, and a second region 8, which is represented by a mean-level value of the preliminary read-out image signal SP detected from the background region 6 in the X-ray image shown in FIG. 2B.

When the preliminary read-out image signal SP is fed into the computer system 40, pattern matching is carried out between the preliminary read-out image signal SP and each of the image signal SS representing the standard pattern shown in FIG. 3A and the image signal SR representing the reversed pattern shown in FIG. 3B. In this manner, a judgment is made as to whether the preliminary read-out image signal SP represents the X-ray image of the right shoulder or of the left shoulder. In this embodiment, during the pattern matching, calculations are made to find square values of differences between the image signal components of the preliminary read-out image signal SP and each of the image signals SS and SR, which image signal components represent corresponding picture elements in the preliminary read-out image signal SP and each of the image signals SS and SR, i.e. $(SS-SP)^2$ and $(SR-SP)^2$. The square values obtained for the whole area of the image are added, and sums QS and QR are calculated with the formulas $$Q_s = \Sigma(S_s - S_p)^2 \qquad (1)$$

$$Q_R = \Sigma(S_R - S_p)^2 \qquad (2)$$

It is judged that the X-ray image represented by the preliminary read-out image signal SP is the image associated with the sums QS or QR, whichever is smaller.

In cases where it has been judged that the image represented by the preliminary read-out image signal SP is of the left shoulder (FIG. 2B), the preliminary read-out image signal SP is processed such that the image represented by the preliminary read-out image signal SP is reversed. In this manner, an image signal corresponding to the image of the right shoulder shown in FIG. 2A, or an image signal corresponding to the image of the left shoulder is always fed into a neural network, which will be described below.

In the manner described above, the image signal is processed such that the processed image signal represents the predetermined standard pattern (i.e. the pattern of the right shoulder in this embodiment). The processed image signal is then fed into the neural network. Therefore, the number of units constituting the neural network can be reduced, and the requirement of the storage capacity of a storage means for storing the weight coefficients, which represent the degrees of connections between the units, can be kept small. Also, the learning of the neural network can be finished quickly.

FIG. 4 is an explanatory view showing an example of the neural network which is provided with a learning function by back propagation method. As described above, the term "learning function by back propagation method" as used herein means the learning algorithms in a neural network, with which the output of the neural network is compared with a correct answer (an instructor signal), and the weight of connections (i.e. the weight of synapse connections) is corrected sequentially from the output side to the input side of the neural network.

With reference to FIG. 4, the neural network comprises a first layer (an input layer), a second layer (an intermediate layer), and a third layer (an output layer). The first, second, and third layers are composed respectively of n1 number of units, n2 number of units, and two units. Signals F1, F2, ..., Fn1 fed into the first layer (the input layer) are the image signal components of the preliminary read-out image signal SP representing the picture elements in the X-ray image (the reversed image in the cases of the images of the left shoulder). Two outputs $y_1^3$ and $y_2^3$ obtained from the third layer (the output layer) are the signals corresponding to the sensitivity and the contrast during the final readout. An i'th unit of a k'th layer is indicated by $u_i^k$. The total input into the unit $u_i^k$ is indicated by $x_i^k$, and the total output therefrom is indicated by $y_i^k$. The weight of connection from the unit $u_i^k$ to a unit $u_j^{k+1}$ is indicated by $W_{1ij}^{k,k+1}$. Also, each unit $u_j^k$ has the same characteristic function, which is expressed as $$f(x) = \frac{1}{1 - e^x} \quad (3)$$

The input $x_j^k$ into each unit $u_j^k$ and the output $y_j^k$ therefrom are expressed as $$x_j^k = \sum_i W_i^{k-1,k} \cdot y_i^{k-1} \quad (4)$$

$$y_j^k = f(x_j^k) \quad (5)$$

Inputs F1, F2, ..., Fn1 into the units $u_i^1$, where i = 1, 2, ..., n1, which units constitute the input layer, are fed into the units $u_i^1$, where i = 1, 2, ..., n1, without being weighted. The n1 number of signals F1, F2, ..., Fn1 are weighted with the weights of connection $W_{ij}^{k,k+1}$, and transmitted to the ultimate outputs $y_1^3$ and $y_2^3$. In this manner, the read-out conditions for the final readout (i.e. the sensitivity and the contrast) are obtained.

How the weights of connection $W_{ij}^{k,k+1}$ are determined will be described hereinbelow. First, initial values of the weights of connection $W_{ij}^{k,k+1}$ are given by random numbers. The range of the random numbers should preferably be limited such that, even when the values of the inputs F1, F2, ..., Fn1 fluctuate to the largest extent, the outputs $y_1^3$ and $y_2^3$ may take values falling within a predetermined range or values close to said predetermined range.

Thereafter, preliminary read-out image signals are obtained in the manner described above from a plurality of stimulable phosphor sheets storing X-ray images of the right or left shoulder, for which the appropriate read-out conditions for the final readout are known. As for the X-ray images of the left shoulder, the preliminary read-out image signals are reversed. In this manner, the n1 number of inputs F1, F2, ..., Fn1 are obtained. The n1 number of inputs F1, F2, ..., Fn1 are fed into the neural network shown in FIG. 4, and the outputs $y_i^k$ of the respective units $u_k$ are monitored.

After the outputs $y_i^k$ are obtained, square errors E1 and E2 between the ultimate outputs $y_1^3$, $y_2^3$ and the instructor signals (the sensitivity $y_1^3$ and the contrast $y_2^3$ representing the read-out conditions for the final readout appropriate for the image are calculated with the formulas $$E_1 = \frac{1}{2}(y_1^3 - y_1^3)^2 \quad (6)$$

$$E_2 = \frac{1}{2}(y_2^3 - y_2^3)^2 \quad (7)$$

The weights of connection $W_{ij}^{k,k+1}$ are then corrected such that the square errors E1 and E2 become the smallest. The output $y_1^3$ will be described hereinbelow. The descriptions below also apply to the output $y_2^3$.

The square error E1 is a function of $W_{ij}^{k,k+1}$. Therefore, in order for the square error E1 to be minimized, the weights of connection $W_{ij}^{k,k+1}$ are corrected with the formula $$W_{ij}^{k,k+1} = W_{ij}^{k,k+1} - \eta \cdot \frac{\partial E_1}{\partial W_{ij}^{k,k+1}} \quad (8)$$

where $\eta$ denotes a coefficient, which is referred to as a learning coefficient.

The following formula obtains:

$$\frac{\partial E_1}{\partial W_{ij}^{k,k+1}} = \frac{\partial E_1}{\partial x_j^{k+1}} \cdot \frac{\partial x_j^{k+1}}{\partial W_{ij}^{k,k+1}} \quad (9)$$

Also, Formula (4) gives $$x_j^{k+1} = \sum_i W_{ij}^{k,k+1} \cdot y_i^k \quad (4)'$$

Therefore, Formula (9) gives $$\frac{\partial E_1}{\partial W_{ij}^{k,k+1}} = \frac{\partial E_1}{\partial x_j^{k+1}} \cdot y_i^k \quad (10)$$

From Formula (6), the following formula obtains:

$$\frac{\partial E_1}{\partial x_1^3} = (y_1^3 - y_1^3) \cdot \frac{\partial y_1^3}{\partial x_1^3} \quad (11)$$

Formula (11) can be changed with Formula (5) into $$\frac{\partial E_1}{\partial x_1^3} = (y_1^3 - y_1^3) \cdot f'(x_1^3) \quad (12)$$

From Formula (3), the following formula obtains:

$$f'(x) = f(x)(1 - f(x)) \quad (13)$$

Therefore, $$f'(x_1^3) = y_1^3 \cdot (1 - y_1^3) \quad (14)$$

Setting k=2 in Formula (10) and substituting Formulas (12) and (14) into Formula (10) yield $$\frac{\partial E_1}{\partial W_{i1}^2{}^3} = \frac{\partial E_1}{\partial x_1^3} \cdot y_i^2 = (y_1^3 - y_1^3) \cdot y_1^3 \cdot (1 - y_1^3) \cdot y_i^2 \quad (15)$$

Substitution of Formula (15) into Formula (8) yields $$W_{i1}^{2}{}^{3} = W_{i1}^{2}{}^{3} - \eta \cdot (y_1^3 - y_1^3) \cdot y_1^3 \cdot (1 - y_1^3) \cdot y_i^2 \quad (16)$$

The weights of connection $W_{i1}^2{}^3$, where i=1, 2, 3, are corrected with Formula (16).

Also, the following formula obtains:

$$\frac{\partial E_1}{\partial x_j^2} = \frac{\partial E_1}{\partial x_1^3} \cdot \frac{\partial x_1^3}{\partial x_j^2} \quad (17)$$

Substitutions of Formulas (4) and (5) into Formula (17) yields $$\frac{\partial E_1}{\partial x_j^2} = \frac{\partial E_1}{\partial x_1^3} \cdot \frac{\partial}{\partial x_j^2} \left( \sum_j W_{j1}^2{}^3 \cdot y_j^2 \right) = \frac{\partial E_1}{\partial x_1^3} \cdot W_{j1}^2{}^3 \cdot f'(x_j^2) \quad (18)$$

Formula (13) gives $$f'(x_j^2) = y_j^2 \cdot (1 - y_j^2) \quad (19)$$

Substitution of Formulas (12), (14), and (19) into Formula (18) yields $$\frac{\partial E_1}{\partial x_j^2} = (y_1^3 - y_1^3) \cdot y_1^3 \cdot (1 - y_1^3) \cdot y_j^2 \cdot (1 - y_j^2) \cdot W_{j1}^2{}^3 \quad (20)$$

Setting k=1 in Formula (10) and substituting Formula (20) into Formula (10) yield $$\frac{\partial E_1}{\partial W_{ij}^1{}^2} = \frac{\partial E_1}{\partial x_j^2} \cdot y_i^1 = (y_1^3 - y_1^3) \cdot \quad (21)$$

$$y_1^3 \cdot (1 - y_1^3) \cdot y_j^2 \cdot (1 - y_j^2) \cdot W_{j1}^2{}^3 \cdot y_i^1$$

Substitution of Formula (21) into Formula (8) and setting of k=1 yield $$W_{ij}^{1}{}^{2} = W_{ij}^{1}{}^{2} - \eta \cdot (y_1^3 - y_1^3) \cdot y_1^3 \cdot \quad (22)$$

$$(1 - y_1^3) \cdot y_j^2 \cdot (1 - y_j^2) \cdot y_i^1 \cdot W_{j1}^2{}^3$$

The values of the weights of connection $W_{i1}^2{}^3$, where i=1, 2, ..., n1, which have been corrected with Formula (16), are substituted into Formula (22). In this manner, the weights of connection $W_{ij}^1{}^2$, where i=1, 2, ..., n1 and j=1, 2, ..., n2, are corrected.

Theoretically, the weights of connection $W_{ij}^{k,k+1}$ can be converged to predetermined values by using Formulas (16) and (22), using a sufficiently small learning coefficient $\eta$ and carrying out the learning operations very many times. However, if a sufficiently small learning coefficient $\eta$ is used, the speed with which the learning operations are effected will become low. If a very large learning coefficient $\eta$ is used, "vibration" will occur in the learning operations (i.e. weights of connection do not converge to predetermined values). Therefore, actually, the vibration is prevented by employing an inertia term, which is expressed in Formula (23), in the calculations of the correction amounts for the weights of connection, and the learning coefficient $\eta$ is set to a slightly large value.

$$\Delta W_{ij}^{k,k+1}(t+1) = \alpha \cdot \Delta W_{ij}^{k,k+1}(t) + \eta \cdot \frac{\partial E_1}{\partial x_j^{k+1}} \cdot y_i^k \quad (23)$$

where $\alpha$ denotes the coefficient referred to as the inertia term, and $\Delta W_{ij}^{k,k+1}(t)$ denotes the correction amount, which is used during the t'th learning operation and which is obtained by subtracting a weight of connection $W_{ij}^{k,k+1}$, which has not been corrected, from a weight of connection $W_{ij}^{k,k+1}$, which has been corrected. (Such an inertia term is described in, for example, "Learning internal representations by error propagation In Parallel Distributed Processing" by D. E. Rumelhart, G. E. Hinton and R. J. Williams, Volume 1, J. L. McClelland, D. E. Rumelhart and The PDP Research Group, MIT Press, 1986b.)

By way of example, the inertia term $\alpha$ is set to 0.9, the learning coefficient $\eta$ is set to 0.25, and 200,000 times of corrections (learning operations) are carried out for each of the weights of correction $W_{ij}^{k,k+1}$. Thereafter, each of the weights of correction $W_{ij}^{k,k+1}$ is fixed at a final value. At the time at which the learning operations are completed, the two outputs $y_1^3$ and $y_2^3$ represents the appropriate sensitivity and the appropriate contrast during the final readout.

Therefore, after the learning operations are completed, in order for appropriate read-out conditions for the final readout to be obtained, a preliminary read-out image signal SP representing an X-ray image is fed into the neural network shown in FIG. 4. The outputs $y_1^3$ and $y_2^3$ obtained from the neural network are utilized as signals representing the read-out conditions (i.e. the sensitivity and the contrast) for the final readout appropriate for the X-ray image. Because the learning operations have been carried out in the manner described above, the signals accurately represent the appropriate read-out conditions for the final readout.

The number of layers of the neural network is not limited to three. Also, no limitation is imposed on the number of the units of each layer. The number of the units of each layer may be determined in accordance with the number of the picture elements represented by the preliminary read-out image signal SP, which is fed into the neural network, the accuracy, with which the read-out conditions for the final readout are to be obtained, or the like.

The voltage applied to the photomultiplier 21' of the final read-out means 100', the amplification factor of the logarithmic amplifier 26', and the like, are controlled in accordance with the read-out conditions for the final readout, which have been adjusted by the neural network. The final readout is carried out under the controlled conditions.

The neural network, the learning operations of which have been carried out such that it can determine the read-out conditions for the final readout, is connected to the X-ray image read-out apparatus.

The X-ray image read-out apparatus feeds the image signal, which has been obtained by carrying out the final readout under the read-out conditions determined in the manner described above, into a reproducing apparatus (not shown). The image signal is also fed into the computer system. In the computer system, a visible image is reproduced from the image signal and displayed on the CRT display device 44. Therefore, by observing the displayed visible image, the user can carry out the learning operations of the neural network by the back propagation method.

In this manner, after the neural network is incorporated into the radiation image processing apparatus, the learning operations of the neural network can be continued by the user, such as a physician at the location of the radiation image processing apparatus, and the accuracy, with which the read-out conditions for the final readout are determined by the neural network, can be improved.

In the aforesaid embodiment, before the preliminary read-out image signal SP representing an X-ray image of the shoulder is fed into the neural network, pattern matching is effected with respect to the patterns shown in FIGS. 3A and 3B. A judgment is thereby made as to whether the X-ray image represented by the preliminary read-out image signal SP is the standard image (i.e. the image of the right shoulder) or the reversed image (i.e. the image of the left shoulder). In cases where the X-ray image represented by the preliminary read-out image signal SP is the reversed image (i.e. the image of the left shoulder), the preliminary read-out image signal SP is processed such that the processed image signal represents the standard image (i.e. the image of the right shoulder). The radiation image processing apparatus in accordance with the present invention is not limited to the processing of images of the shoulder. For example, the radiation image processing apparatus in accordance with the present invention is also applicable when images of the right and left hands, images of the right and left sides of the head or the abdomen, and the like, are processed.

Also, the radiation image processing apparatus in accordance with the present invention is not limited to the processing of images reversed horizontally. For example, the radiation image processing apparatus in accordance with the present invention is also applicable when an image is to be rotated into a normal orientation in cases where an image signal representing an inclined image is obtained due to oblique setting of a stimulable phosphor sheet during the image recording operation, or an image signal representing a laterally inclined image or an inverted image is obtained due to setting of a stimulable phosphor sheet in an incorrect direction during the image read-out operation. The radiation image processing apparatus in accordance with the present invention is also applicable when images having different scales of enlargement (or reduction), which are obtained from, for example, a direct image recording operation and fluorography, are to be corrected. The radiation image processing apparatus in accordance with the present invention is further applicable when position adjustment is to be carried out such that an object image region may be located at the center area of an image in cases where the object image pattern was recorded at a peripheral part of the image. Additionally, the radiation image processing apparatus in accordance with the present invention is applicable when a combination of the aforesaid processes is to be carried out.

In the aforesaid embodiment, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary readout and the final readout. In this case, after being subjected to the preliminary readout, the stimulable phosphor sheet 11 may be moved back to the position at which image readout is started. Thereafter, the final readout may be carried out.

In cases where a single read-out means is utilized to perform both the preliminary readout and the final readout, it is necessary to change the intensity of the light beam used in the preliminary readout and the final readout. For this purpose, various methods may be employed as described above, for example, a laser beam source or the like may change the intensity of the light beam.

In the aforesaid embodiment, the read-out conditions for the final readout are adjusted by the computer system 40. Alternatively, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

The aforesaid embodiment is applied to the radiation image read-out apparatus wherein the preliminary readout is carried out. However, the radiation image processing apparatus in accordance with the present invention is also applicable to radiation image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by the computer system 40. The image signal is processed under the calculated image processing conditions.

The technique described above is also applicable when the shape and location of an irradiation field are determined or an abnormal pattern is detected from an image.

Specifically, when a radiation image of an object is recorded on a recording medium, it is often desirable for portions of the object not related to a diagnosis, or the like, to be prevented from being exposed to radiation. Therefore, an irradiation field stop is often used to limit the irradiation field to an area smaller than the overall recording region of the recording medium so that radiation is irradiated only to that portion of the object, which is to be viewed, and part of the recording medium. In such cases, before the read-out conditions for the final readout and/or the image processing conditions are calculated on the basis of the results of an analysis of the image signal, it is necessary to determine the shape and location of an irradiation field. The read-out conditions for the final readout and/or the image processing conditions should thereafter be determined on the basis of only the image signal representing image information stored in the region inside of the irradiation field. The radiation image processing apparatus in accordance with the present invention is also applicable when the neural network is used to determine the shape and location of an irradiation field and to detect an abnormal pattern from an image.

An embodiment of the determination apparatus in accordance with the present invention will be described hereinbelow. In this embodiment, a stimulable phosphor sheet is used, and an X-ray image of a human body is processed. The determination apparatus in accordance with the present invention is not limited to a specific item of determination, and is applicable widely when one of various intended items is determined from an image signal.

In this embodiment, a neural network is prepared which receives an image signal representing an X-ray image. The neural network determines read-out conditions for the final readout varying in accordance with characteristics of an image, such as the portion of the object the image of which was recorded (e.g. the head, the neck, the chest, or the abdomen), the orientation in which the object was placed when the image of the object was recorded (e.g. a front image, a right side image, or a left side image), and the mean value of the image signal (i.e. the mean value of the amount of energy stored on the stimulable phosphor sheet).

Figure 10A:
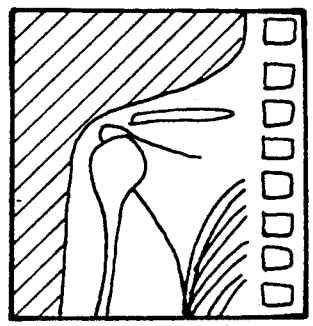
FIGS. 10A and 10B are explanatory views showing examples of X-ray images of the shoulder and the head.
Figure 10B:
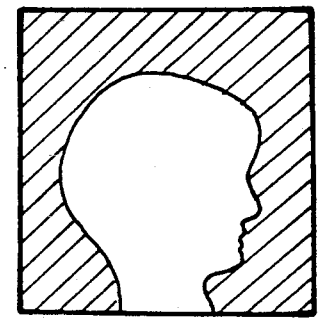

FIGS. 10A and 10B show examples of X-ray images stored on stimulable phosphor sheets by the X-ray image recording apparatus shown in FIG. 5.

FIGS. 10A and 10B show the X-ray images of the right shoulder and the side of the head. These X-ray images are mere examples, and X-ray images of various portions of objects located in various orientations are recorded. For example, front and side images of necks, and front images of chests are recorded.

The embodiment of the determination apparatus in accordance with the present invention is incorporated in the computer system 40 shown in FIG. 6.

A preliminary read-out image signal SP is obtained from the X-ray image read-out apparatus shown in FIG. 6 by carrying out a preliminary readout of the X-ray image shown in FIG. 10A or FIG. 10B in the same manner as that described above. The preliminary read-out image signal SP is then fed into the computer system 40.

The computer system 40 stores information concerning the neural network shown in FIG. 4 (or the coefficients representing the weights of connections of neurons constituting the neural network), which determines the read-out conditions for the final readout suitable for the characteristics of the image. When the preliminary read-out image signal SP is fed into the computer system, the information concerning the neural network is read from the memory of the computer system. In order for the number of the points of inputs to the neural network to be reduced, the preliminary read-out image signal SP is thinned out uniformly over the whole area of the X-ray image. The preliminary read-out image signal SP, which has been thinned out, is fed into the neural network. From the received preliminary read-out image signal SP, the neural network determines the read-out conditions for the final readout, i.e. the sensitivity and the contrast during the final readout. The voltage applied to the photomultiplier 21', the amplification factor of the logarithmic amplifier 26', and the like, are controlled in accordance with the sensitivity and the contrast.

In this embodiment, signals F1, F2, ..., Fnl fed into the first layer (the input layer) of the neural network shown in FIG. 4 are the image signal components of the preliminary read-out image signal SP representing the picture elements in the X-ray image, which image signal components have been thinned out. The outputs $y_1^3$ and $y_2^3$ obtained from the third layer (the output layer) are the signals corresponding to the sensitivity and the contrast during the final readout.

By using the X-ray image read-out apparatus shown in FIG. 6, preliminary read-out image signals are obtained in the manner described above from a plurality of stimulable phosphor sheets storing X-ray images, for which the appropriate read-out conditions for the final readout are known. The preliminary read-out image signal SP is then thinned out. In this manner, the nl number of inputs F1, F2, ..., Fnl are obtained. The nl number of inputs F1, F2, ..., Fnl are fed into the neural network shown in FIG. 4, and the learning operations of the neural network are carried out in the same manner as that described above. In this embodiment, the instructor signals $y_1^3$ and $y_2^3$ represent the sensitivity and the contrast, respectively, which are appropriate for the image. By carrying out the learning operations, the weights of connections $W_{i,j}^{k,k+1}$ are fixed at final values. In this case, after the X-ray image recording and reproducing system provided with the determination apparatus for determining the read-out conditions for the final readout by using the neural network is located at the user, the learning operations are continued in the manner, which will be described later. Therefore, the final values mean the final values at the original operation starting stage at the user. When the learning operations are finished, the outputs $y_1^3$ and $y_2^3$ represent the approximately appropriate sensitivity and contrast during the final readout.

If the number of the units $u_i^k$, the number k of the layers, or the like, is increased, more accurate read-out conditions for the final readout (i.e. the sensitivity and the contrast) can be obtained for various modes of X-ray images. However, in such cases, a very large number of learning operations must be repeated, and the storage device for storing the information representing the weights of connections $W_{i,j}^{k,k+1}$ must have a very large storage capacity. In this embodiment, in order for these problems to be eliminated, the number of the units $u_i^k$, the number k of the layers, or the like, is kept small such that the read-out conditions for the final readout, which are approximately appropriate, may be obtained for every X-ray image falling within the range of performance at the time at which the initial learning operations are finished in the manner described above. In this manner, a neural network is employed such that only a small number of initial learning operations may be carried out. Also, a dictionary means described below is prepared and incorporated in the computer system.

Figures 7, 8:
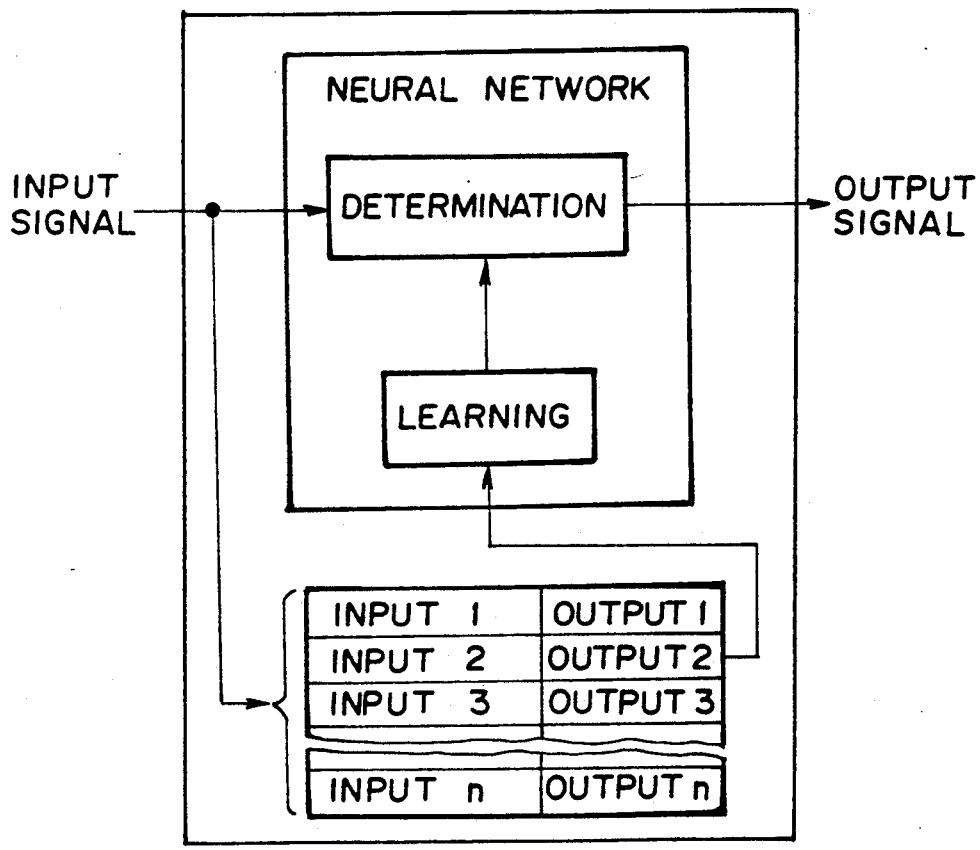
FIG. 7 is a diagram showing a dictionary means.
FIG. 8 is a diagram showing a means for determining the read-out conditions for the final readout, which is provided with a neural network and which has been located at a user.

FIG. 7 shows an example of the dictionary means.

A plurality of sets of input signals and output signals representing correct answers corresponding to the input signals are stored in the dictionary means for a wide variety of modes of X-ray images falling within the range of the performance of the X-ray image recording and reproducing system. Each set is composed of nl number of inputs F1, F2, ..., Fnl obtained from a stimulable phosphor sheet storing an X-ray image, for which the appropriate read-out conditions for the final readout are known, and the outputs (i.e. the instructor signals $y_1^3$ and $y_2^3$), which represent correct answers corresponding to the n1 number of the inputs F1, F2, ..., Fn1. Such sets have been obtained from the aforesaid initial learning operations. After the initial learning operations are finished in the manner described above, the whole X-ray image recording and reproducing system provided with the dictionary means is delivered to the user.

FIG. 8 is a diagram showing a means for determining the read-out conditions for the final readout, which is provided with the neural network and which has been located at the user.

At the user, an X-ray image, for which the appropriate read-out conditions for the final readout are unknown, is recorded on a stimulable phosphor sheet 11 in the same manner as that described above. A preliminary readout is then carried out on the X-ray image. A preliminary read-out image signal SP obtained from the preliminary readout is thinned out, and inputs F1, F2, ..., Fn are thereby obtained. The inputs F1, F2, ..., Fn are fed into the neural network shown in FIG. 4. The neural network determines the read-out conditions for the final readout (i.e. the sensitivity and the contrast), which are appropriate for the X-ray image represented by the inputs F1, F2, ..., Fn, and feeds out the outputs $y_1^3$ and $y_2^3$ representing the determined read-out conditions for the final readout (i.e. the sensitivity and the contrast).

After the read-out conditions for the final readout, $y_1^3$ and $y_2^3$, are determined in the manner described above, the voltage applied to the photomultiplier 21' of the final read-out means 100', the amplification factor of the logarithmic amplifier 26' of the final read-out means 100', and the like, are controlled in accordance with the determined read-out conditions for the final readout. The final readout is then carried out under the controlled conditions.

Before or after the read-out conditions for the final readout, $y_1^3$ and $y_2^3$, are determined in the manner described above, operations are carried out to find the levels of correlation between the inputs F1, F2, ..., Fn and inputs $F_1^i, F_2^i, \ldots, F_n^i$ of each set i constituting the dictionary means. A set, which is associated with the highest level of correlation with the inputs F1, F2, ..., Fn, is thus found. In this embodiment, for each set i, a variance $\sigma_i^2$ is calculated with the formula $$\sigma_i^2 = \sum_{l=1}^{n} (F_l - F_l^i)^2 \quad (24)$$

A set i, which is associated with the smallest variance $\sigma_i^2$, is found. In this manner, for example, a set 2 of an input 2 and an output 2 is found. Thereafter, the input 2, which constitutes the set 2 and which is composed of $F_1^2, F_2^2, \ldots, F_n^2$, is fed into the neural network. The learning operations of the neural network are carried out by using the output 2 as the instructor signal. In this manner, the learning operations of the neural network are carried out for X-ray images, for which the appropriate read-out conditions for the final readout are known and which have a high level of correlation with the X-ray images actually used by the user. Therefore, the neural network can be modified in accordance with the manner of using of the user such that more accurate read-out conditions for the final readout may be determined for X-ray images having patterns encountered frequently at the user.

Figure 9:
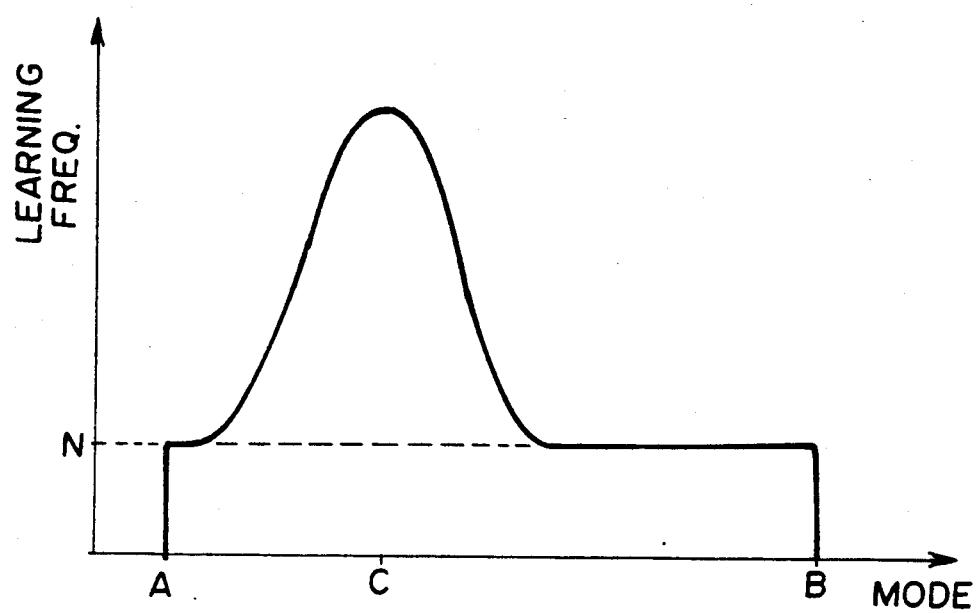
FIG. 9 is a graph showing the frequency with which the learning operations of a neural network are carried out.

FIG. 9 is a graph showing the frequency with which the learning operations of the neural network are carried out.

At the manufacturer, it is necessary for the learning operations of the neural network to be carried out for a wide variety of modes of X-ray images falling within the maximum range of performance, e.g. the range of A to B shown in FIG. 9, such that the neural network may be used in any manner by the user within the wide range of performance. N number of learning operations are carried out for each of modes falling within the range of A to B, such that the neural network can determine the read-out conditions for the final readout, which include a comparatively large error but fall within an acceptable range, when an image signal representing any mode of an X-ray image falling within the wide range of performance is fed into the neural network. After such learning operations have been finished, the X-ray image recording and reproducing system provided with the neural network is delivered to the user. In cases where the X-ray image recording and reproducing system is used only in modes falling within a comparatively narrow range around, for example, a specific mode C, as the operations of the X-ray image recording and reproducing system are repeated by the user, the learning operations of the neural network are repeated many times for the mode C and modes close to the mode C. Therefore, it becomes possible for the neural network to determine more accurate read-out conditions for the final readout for the mode C and the modes close to the mode C. In such cases, there is the risk that the neural network changes such that it may yield slightly inappropriate read-out conditions for the final readout for, e.g., a mode B, which is different and far apart from the mode C, and modes close to the mode B. However, such risk occurs because the X-ray image recording and reproducing system is not used at the user in the mode B nor in the modes close to the mode B. Therefore, no problem will occur for this user.

In the aforesaid embodiment of the determination apparatus in accordance with the present invention, when the learning operations are carried out, the variance $\sigma_i^2$ is calculated for each set i, and a set i, which is associated with the smallest variance $\sigma_i^2$, is found. Each time a single set i is found in this manner, a single learning operation may be carried out by using the set i. Alternatively, a plurality of learning operations may be carried out each time a single set i is found. Also, for a plurality of sets i, the values of the variance $\sigma_i^2$ may be compared with a threshold value Th. A plurality of sets, which are associated with the variance $\sigma_i^2$ smaller than the threshold value Th, may be found, and a single learning operation or a plurality of learning operations may then be carried out for each of the sets thus found. Additionally, no limitation is imposed on how the level of correlation is found. For example, instead of the variance $\sigma_i^2$ being calculated, a pattern matching technique may be employed. Alternatively, any of techniques for finding an X-ray image, which is approximate to a specific X-ray image, in accordance with a certain criterion may be employed.

In the aforesaid embodiment of the determination apparatus in accordance with the present invention, the neural network shown in FIG. 4 is employed which is composed of three layers. However, no limitation is imposed on the number of layers of the neural network.

Also, the number of the units $u_i^k$ constituting each layer, the number of input points, the number of output points, or the like, may be set to any of appropriate values.

Also, in the aforesaid embodiment of the determination apparatus in accordance with the present invention, the neural network is used to determine the read-out conditions for the final readout in the X-ray image recording and reproducing system. However, the determination apparatus in accordance with the present invention is not limited to the determination of the read-out conditions for the final readout. The determination apparatus in accordance with the present invention is applicable widely when determinations are carried out for various items on the basis of various modes of input signals, and output signals representing the results of the determinations are fed out.

An embodiment of the first radiation image read-out apparatus in accordance with the present invention will be described hereinbelow. In this embodiment, a stimulable phosphor sheet is used.

This embodiment is constituted in the manner shown in FIG. 6. A preliminary read-out image signal SP is obtained from the X-ray image read-out apparatus shown in FIG. 6 by carrying out a preliminary readout of the X-ray image shown in FIG. 10A or FIG. 10B in the same manner as that described above. The preliminary read-out image signal SP is then fed into the computer system 40. The computer system 40 is provided with examples of the operation means, the condition input means, and the retraining means of the first radiation image read-out apparatus in accordance with the present invention.

The computer system 40 stores information concerning the neural networks having a configuration shown in FIG. 4 (or the coefficients representing the weights of connections of neurons constituting the neural network), which vary for different characteristics of the image and which determines the read-out conditions for the final readout suitable for the characteristics of the image. Such characteristics include, for example, the portion of the object the image of which was recorded (e.g. the head, the neck, the chest, or the abdomen), the orientation in which the object was placed when the image of the object was recorded (e.g. a front image, a right side image, or a left side image), and the mean value of the image signal (i.e. the mean value of the amount of energy stored on the stimulable phosphor sheet). When the preliminary read-out image signal SP is fed into the computer system, the information concerning the corresponding neural network is read from the memory of the computer system. In order for the number of the points of inputs to the neural network to be reduced, the preliminary read-out image signal SP is thinned out uniformly over the whole area of the X-ray image. The preliminary read-out image signal SP, which has been thinned out, is fed into the neural network. From the received preliminary read-out image signal SP, the neural network determines the read-out conditions for the final readout, i.e. the sensitivity and the latitude during the final readout. The voltage applied to the photomultiplier 21', the amplification factor of the logarithmic amplifier 26', and the like, are controlled in accordance with the sensitivity and the latitude.

The latitude corresponds to the ratio of the largest amount of emitted light, which is capable of being accurately converted into an image signal during a final readout, to the smallest amount of emitted light, which is capable of being accurately converted into an image signal during the final readout. The sensitivity corresponds to the photoelectric conversion factor, which represents to what image signal level a predetermined amount of emitted light is to be converted.

In this embodiment, signals $F1, F2, \ldots, Fn1$ fed into the first layer (the input layer) of the neural network shown in FIG. 4 are the image signal components of the preliminary read-out image signal SP representing the picture elements in the X-ray image, which image signal components have been thinned out. The outputs $y_1^3$ and $y_2^3$ obtained from the third layer (the output layer) are the signals corresponding to the sensitivity and the latitude during the final readout.

By using the X-ray image read-out apparatus shown in FIG. 6, preliminary read-out image signals are obtained in the manner described above from a plurality of stimulable phosphor sheets storing X-ray images, for which the appropriate read-out conditions for the final readout are known. The preliminary read-out image signal SP is then thinned out. In this manner, the $n1$ number of inputs $F1, F2, \ldots, Fn1$ are obtained. The $n1$ number of inputs $F1, F2, \ldots, Fn1$ are fed into the neural network shown in FIG. 4, and the learning operations of the neural network are carried out in the same manner as that described above. In this embodiment, the instructor signals $y_1^3$ and $y_2^3$ the sensitivity and the latitude, respectively, which are appropriate for the image. By carrying out the learning operations, the weights of connections $W_i^{k,k+1}$ are fixed at final values. In this case, after the X-ray image recording and reproducing system provided with the operation means for determining the read-out conditions for the final readout by using the neural network is located at the user, the learning operations are continued in the manner, which will be described later. Therefore, the final values mean the final values at the original operation starting stage at the user. When the learning operations are finished, the outputs $y_1^3$ and $y_2^3$ represent the approximately appropriate sensitivity and latitude during the final readout.

If the number of the units $u_i^k$, the number k of the layers, or the like, is increased, more accurate read-out conditions for the final readout (i.e. the sensitivity and the latitude) can be obtained for various modes of X-ray images. However, in such cases, a very large number of learning operations must be repeated, and the storage device for storing the information representing the weights of connections $W_i^{k,k+1}$ must have a very large storage capacity. In this embodiment, in order for these problems to be eliminated, the number of the units $u_1^k$, the number k of the layers, or the like, is kept small such that the sensitivity and the latitude, which are considerably accurate, may be obtained for modes of X-ray images, which are frequently used by general users and which fall within the range of performance, but the sensitivity and the latitude, which include a comparatively large error falling within an acceptable range, may be obtained for modes of X-rays, which are not frequently used, at the time at which the initial learning operations are finished in the manner described above. In this manner, a neural network is employed such that only a small number of initial learning operations may be carried out. Also, a means for manually entering information representing the read-out conditions for the final readout (i.e. the sensitivity and the latitude) and a means for continuing the learning operations of the neural network in accordance with the entered information are incorporated in the computer system.

Figure 11A:
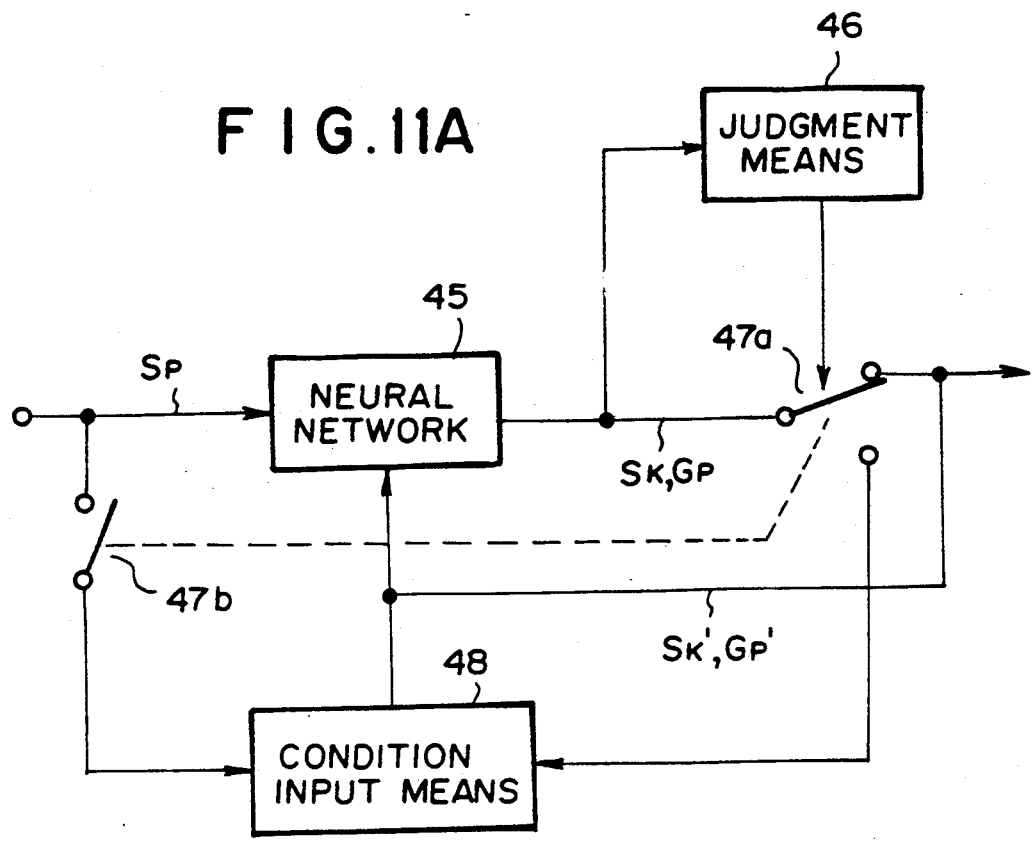
FIGS. 11A and 11B are explanatory views showing how the learning operations of a neural network are continued in a computer system in an embodiment of the radiation image read-out apparatus in accordance with the present invention.

FIG. 11A is an explanatory view showing how the learning operations of the neural network are continued in the computer system 40.

With reference to FIG. 11A, when the preliminary read-out image signal SP is fed into the computer system 40, it is fed into a neural network 45 of the computer system 40. The neural network 45 determines the read-out conditions for the final readout (i.e. the sensitivity Sk and the latitude Gp). Information representing the read-out conditions for the final readout thus determined is fed into a judgment means 46. (In this embodiment, the judgment means 46 is constituted of the combination of the hardware function of the computer system 40 and the software function for carrying out the judgment operations of the computer system 40.) The judgment means 46 stores information representing expected values of the read-out conditions for the final readout (i.e. an expected value $\overline{Sk}$ of the sensitivity, and an expected value $\overline{Gp}$ of the latitude) and their acceptable fluctuation widths (i.e. an acceptable fluctuation width $\Delta Sk$ of the sensitivity and an acceptable fluctuation width $\Delta Gp$ of the latitude) for the respective characteristics of an image, such as the portion of the object the image of which was recorded and the orientation in which the object was placed when the image of the object was recorded. When the read-out conditions for the final readout (i.e. the sensitivity Sk and the latitude Gp) are determined by the neural network 45, the judgment means 46 judges whether the following conditions are or are not satisfied:

$$\overline{Sk} - \Delta Sk \leq Sk \leq \overline{Sk} + \Delta Sk \quad (25)$$

and $$\overline{Gp} - \Delta Gp \leq Gp \leq \overline{Gp} + \Delta Gp \quad (26)$$

In cases where both of Formulas (25) and (26) are satisfied, the information representing the sensitivity Sk and the latitude Gp, which have been determined by the neural network 45, is fed out with switches 47a and 47b being switched to the positions shown in FIG. 11A. In cases where Formula (25) or (26) is not satisfied, the switches 47a and 47b are switched to the opposite positions, and the preliminary read-out image signal SP and the information representing the sensitivity Sk and the latitude Gp, which have been determined by the neural network 45, are fed into a condition input means 48. In this embodiment, the condition input means 48 is constituted primarily of the keyboard 43 and the CRT display device 44 of the computer system 40 shown in FIG. 6. When the preliminary read-out image signal SP and the information representing the sensitivity Sk and the latitude Gp, which have been determined by the neural network 45, are fed into the condition input means 48 (or the computer system 40), a final read-out image signal SQ is simulated, which will be obtained if a final readout is carried out under the sensitivity Sk and the latitude Gp, on the basis of the preliminary read-out image signal SP. A visible image is reproduced from the simulated preliminary read-out image signal SP and displayed on the CRT display device 44. By observing the displayed visible image and operating the keyboard 43, the operator adjusts the image density (or the luminance) and the contrast of the visible image. The image density and the contrast of the visible image correspond to the sensitivity Sk and the latitude Gp during the final readout. Adjusting the image density and the contrast of the visible image to appropriate levels corresponds to the entry of appropriate read-out conditions for the final readout. When the read-out conditions for the final readout (i.e. a sensitivity Sk' and a latitude Gp') are set manually in this manner, a final readout is carried out under the read-out conditions (Sk' and Gp'). Also, the learning operations of neural network the 45 are carried out by utilizing the information representing the read-out conditions (Sk' and Gp') as an instructor signal. By repeating the learning operations, the radiation image read-out apparatus can be modified into the apparatus suitable for the user (or the apparatus adapted to the user's preference concerning, e.g. the general level of the image density).

Figure 11B:
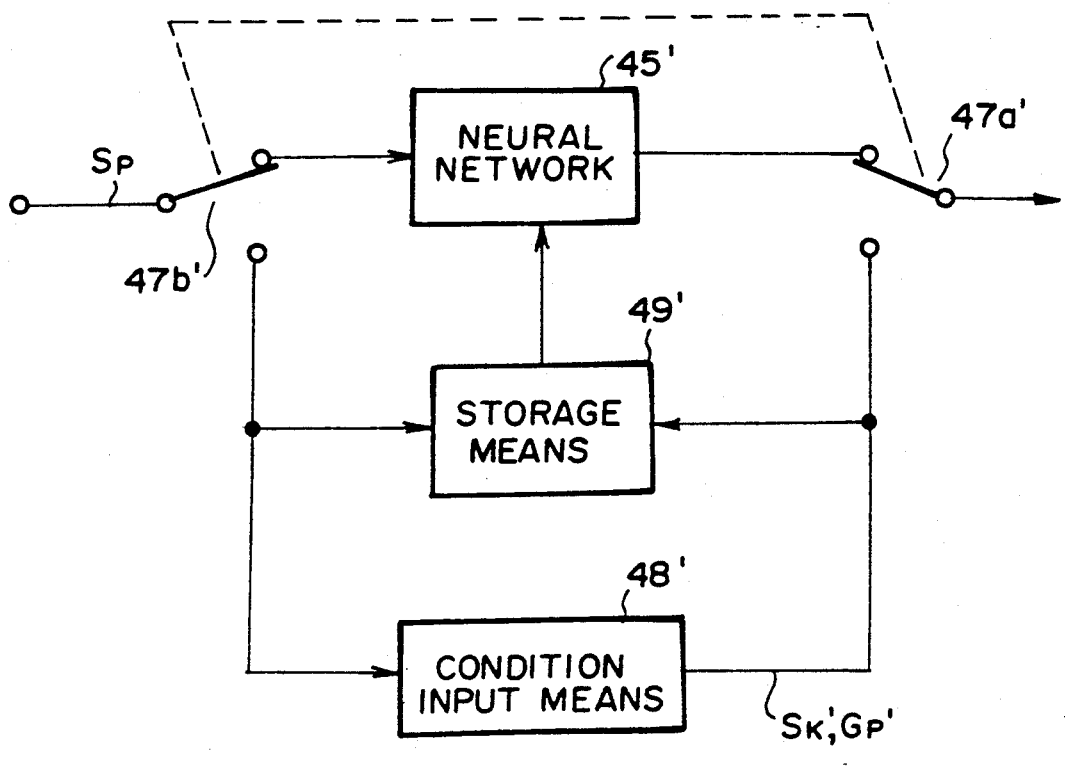

FIG. 11B is an explanatory view showing another example of how the learning operations of the neural network are continued in the computer system 40.

With reference to FIG. 11B, in cases where it is judged by the user during trial operations or normal operations that the accuracy, with which the read-out conditions for the final readout are determined by a neural network 45', is low, switches 47a' and 47b' are switched such that a preliminary read-out image signal SP is fed into a condition input means 48' and a storage means 49', and information representing read-out conditions for the final readout (Sk' and Gp'), which is entered manually from the condition input means 48', is fed out. In cases where the switches 47a' and 47b' are switched in this manner, the information representing the read-out conditions for the final readout (Sk' and Gp') is entered from the condition input means 48' in the same manner as that described above, and a final readout is carried out under the read-out conditions (Sk' and Gp'). Also, the information representing the read-out conditions for the final readout (Sk' and Gp') is fed into the storage means 49'. The storage means 49' stores the information representing the read-out conditions for the final readout (Sk' and Gp') and the corresponding preliminary read-out image signal SP. In this manner, pairs of a number of the preliminary read-out image signals SP, which number is sufficiently large to improve the reliability of the neural network, and the corresponding information representing the read-out conditions for the final readout (Sk' and Gp') are stored in the storage means 49'. Thereafter, the learning operations of the neural network are carried out by utilizing the preliminary read-out image signals SP, which are stored in the storage means 49', as the input signals and utilizing the corresponding information representing the read-out conditions for the final readout (Sk' and Gp') as the instructor signals. Thereafter, the switches 47a' and 47b' are set to the positions shown in FIG. 11B, and the neural network 45' is used to determine the read-out conditions for the final readout.

In the aforesaid embodiment of the first radiation image read-out apparatus in accordance with the present invention, the read-out conditions for the final readout are determined by the neural network and the condition input means. Alternatively, predetermined read-out conditions may be used when the final readout is carried out regardless of the characteristics of the preliminary read-out image signal SP. The neural network and the condition input means may determine the image processing conditions to be used in carrying out image processing of the image signal SQ. The neural network and the condition input means may also determine both the read-out conditions and the image processing conditions.

Figure 12:
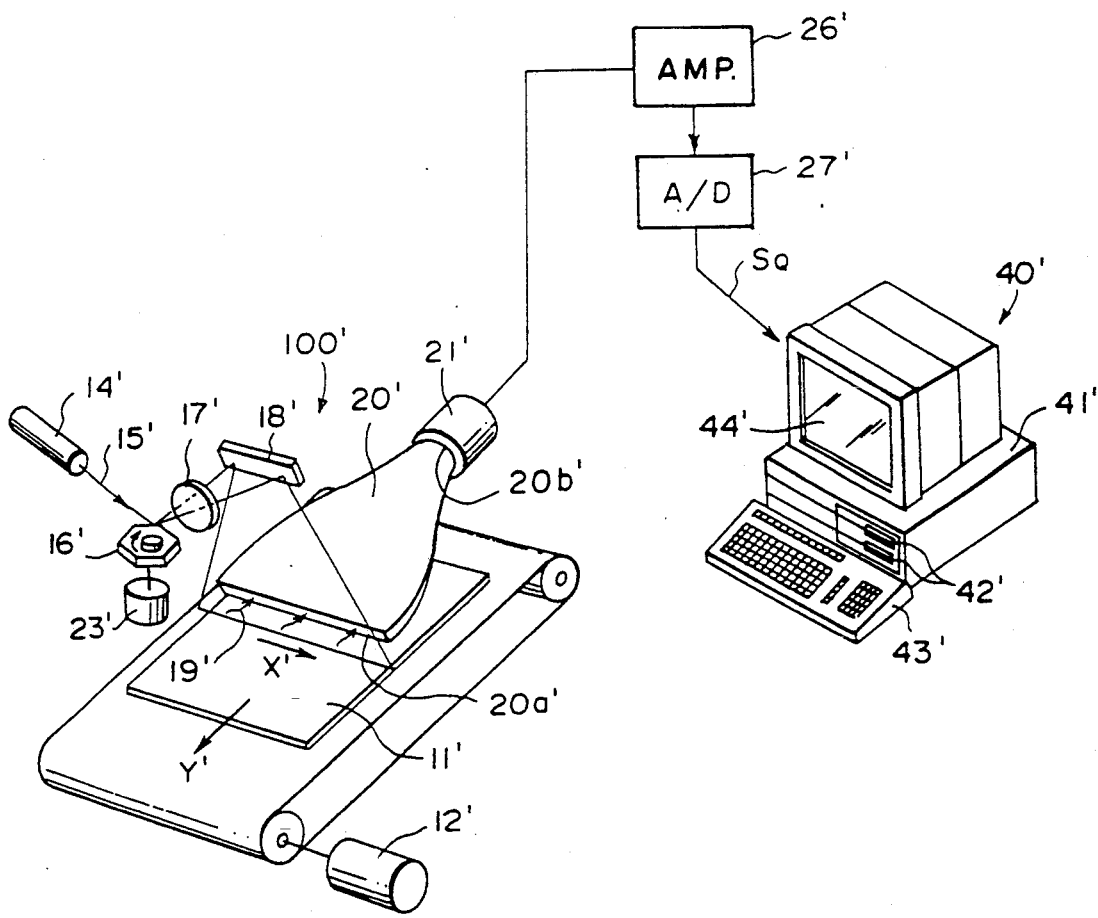
FIG. 12 is a perspective view showing another embodiment of the radiation image read-out apparatus in accordance with the present invention.
Figure 13A:
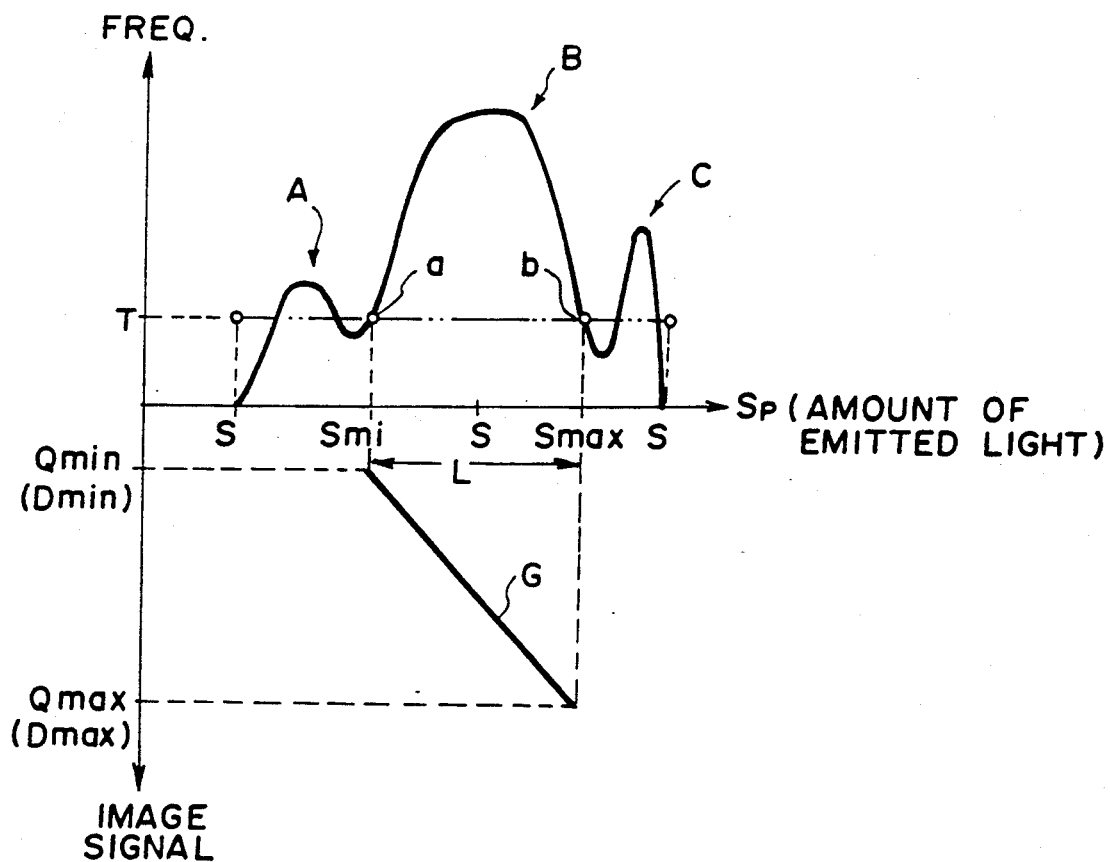
FIGS. 13A, 13B, and 13C are graphs showing examples of probability density functions of preliminary read-out image signals.
Figure 13B:
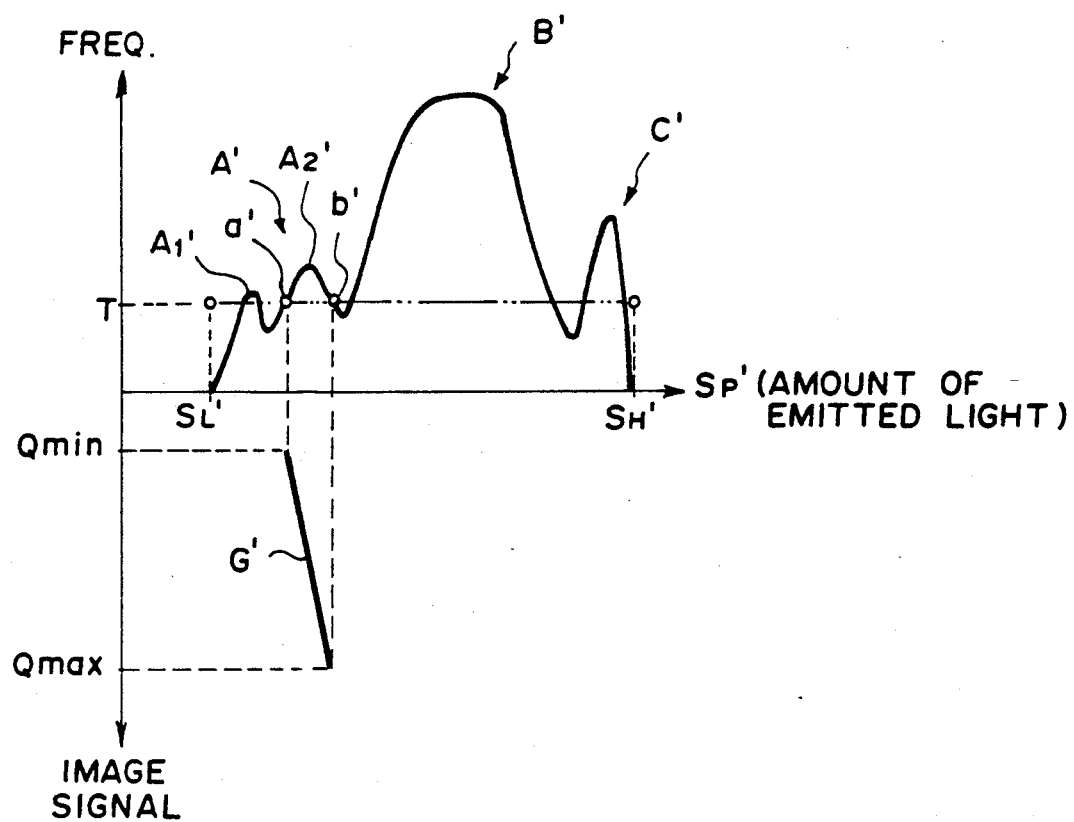
Figure 13C:
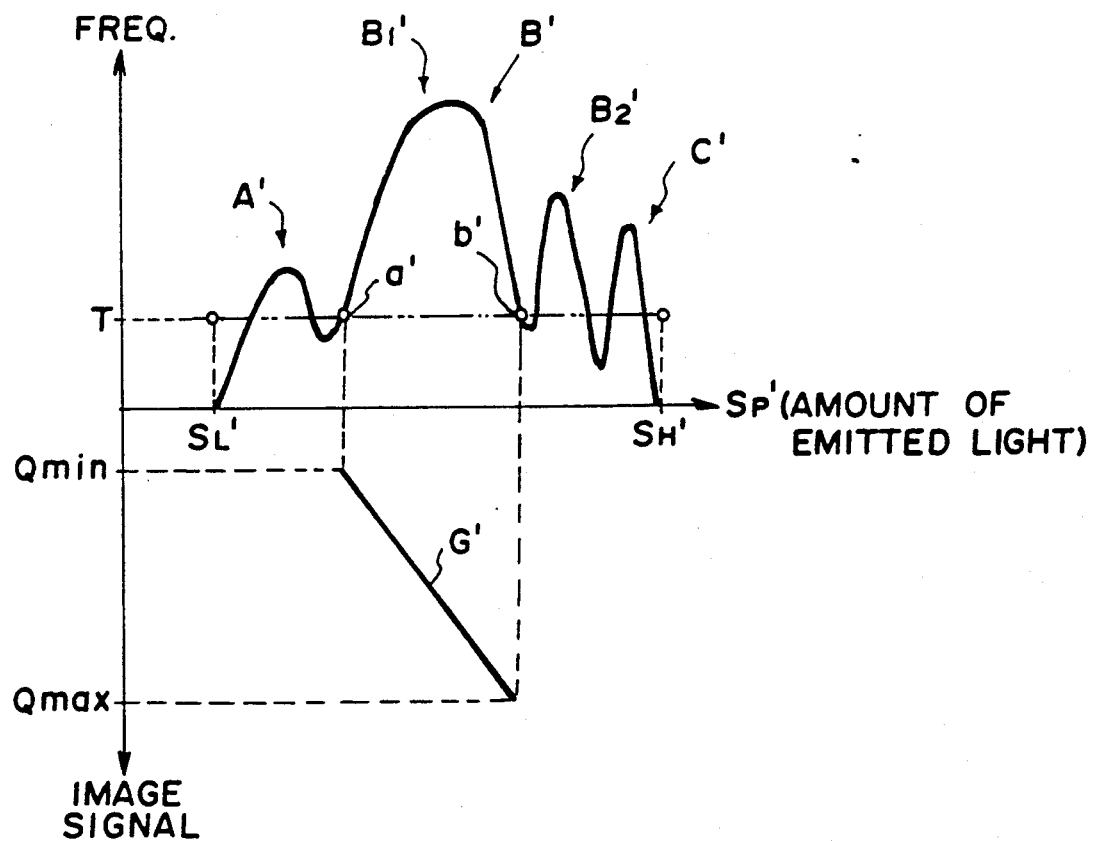

FIG. 12 shows an embodiment of the second radiation image read-out apparatus in accordance with the present invention. In this embodiment, a stimulable phosphor sheet is used, but no preliminary readout is carried out.

In this embodiment, the read-out means 100' is constituted in the same manner as in the final read-out means 100' shown in FIG. 6. In FIG. 12, similar elements are numbered with the same reference numerals with respect to FIG. 6.

The image signal SQ obtained from the A/D converter 27' is fed into a computer system 40'. In the computer system 40', the image processing conditions, under which the image signal SQ is to be image processed, are determined in the same manner as that in the aforesaid embodiment of the first radiation image read-out apparatus in accordance with the present invention such that a visible image can be obtained which has an appropriate density and an appropriate contrast. The image signal obtained from the image processing is fed into an image reproducing apparatus (not shown), which reproduces a hard copy of the radiation image from the image signal.

In the aforesaid embodiments of the first and second radiation image read-out apparatuses in accordance with the present invention, the neural network shown in FIG. 4 is employed which is composed of three layers. However, no limitation is imposed on the number of layers of the neural network. Also, the number of the units $u_i^k$ constituting each layer, the number of input points, the number of output points, or the like, may be set to any of appropriate values.

Also, in the aforesaid embodiments of the first and second radiation image read-out apparatuses in accordance with the present invention, stimulable phosphor sheets are used. The first and second radiation image read-out apparatuses in accordance with the present invention are also applicable when X-ray film is used.

An embodiment of the third radiation image read-out apparatus in accordance with the present invention will be described hereinbelow. In this embodiment, a stimulable phosphor sheet is used.

This embodiment is constituted in the manner shown in FIG. 6. A preliminary read-out image signal SP is obtained from the X-ray image read-out apparatus shown in FIG. 6 by carrying out a preliminary readout of the X-ray image shown in FIG. 10A or FIG. 10B in the same manner as that described above. The preliminary read-out image signal SP is then fed into the computer system 40. The computer system 40 is provided with examples of the operation means, the judgment means, and the input means of the third radiation image read-out apparatus in accordance with the present invention The computer system 40 stores algorithms, which vary for different characteristics of the image and which determine the read-out conditions for the final readout suitable for the characteristics of the image. The computer system 40 also stores information concerning the neural networks having a configuration shown in FIG. 4 (or the coefficients representing the weights of connections of neurons constituting the neural network), which vary for different characteristics of the image and which are used to judge whether the read-out conditions for the final readout determined with the algorithms are or are not correct. Such characteristics include, for example, the portion of the object the image of which was recorded (e.g. the head, the neck, the chest, or the abdomen), and the orientation in which the object was placed when the image of the object was recorded (e.g. a front image, a right side image, or a left side image). When the preliminary read-out image signal SP is fed into the computer system, the read-out conditions for the final readout, i.e. the sensitivity Sk and the latitude Gp during the final readout, are determined in accordance with the corresponding algorithms in the computer system 40. The voltage applied to the photomultiplier 21', the amplification factor of the logarithmic amplifier 26', and the like, are controlled in accordance with the sensitivity Sk and the latitude Gp.

When the read-out conditions for the final readout are determined in the manner described above, an image signal is simulated, which will be obtained if a final readout is carried out under the read-out conditions for the final readout, on the basis of the preliminary read-out image signal SP. A visible image is reproduced from the simulated preliminary read-out image signal SP and displayed on the CRT display device 44. By observing the displayed visible image and operating the keyboard 43, the operator adjusts the image density and the contrast of the visible image. The image density and the contrast of the visible image correspond to the sensitivity Sk and the latitude Gp during the final readout. Adjusting the image density and the contrast of the visible image to appropriate levels corresponds to the adjustment of the read-out conditions for the final readout. Predetermined adjustment widths may be set for the sensitivity Sk and the latitude Gp. When the sensitivity or the contrast was adjusted by the operator beyond the adjustment width, it is regarded that the read-out conditions for the final readout, which have been determined automatically, are incorrect. When no adjustment was carried out or when the sensitivity or the contrast was adjusted slightly within the adjustment width, it is regarded that the read-out conditions for the final readout, which have been determined automatically, are correct.

When information representing the completion of the adjustment (or no adjustment) of the image density and the contrast of the visible image is entered from the keyboard 43, the corresponding neural network is read from the memory of the computer system 40. In order for the number of the points of inputs to the neural network to be reduced, the preliminary read-out image signal SP is thinned out uniformly over the whole area of the X-ray image. The learning operations of the neural network are carried out by using the preliminary read-out image signal SP, which has been thinned out, and the information representing the read-out conditions for the final readout, which have been determined automatically, as the input signals and using the information, which is obtained from the adjustment (or no adjustment) of the visible image and which represents the correctness or incorrectness of the read-out conditions for the final readout, as the instructor signal. After the learning operations of the neural network are repeated a predetermined number of times, a judgment can be made more accurately than the conventional method as to whether the read-out conditions for the final readout, which have been determined automatically with the algorithms, are or are not correct. A visible image may be investigated only when the readout conditions for the final readout are judged as being incorrect. Therefore, the radiation image read-out apparatus becomes easy to operate.

A stimulable phosphor sheet 11' on which the preliminary readout has been finished is placed at a predetermined position in the final read-out means 100' and scanned with the laser beam 15' having an energy level higher than that of the laser beam 15 used during the preliminary readout. A final readout is carried out under the read-out conditions, which have been adjusted by the operator or which have been determined on the basis of the preliminary read-out image signal SP and judged by the neural network as being correct. In this manner, a final read-out image signal is obtained.

After the image signal is digitized in an A/D converter 27', the resulting image signal SQ is fed into the computer system 40, which carries out appropriate image processing on the image signal SQ. After being image processed, the image signal is fed into a reproducing apparatus (not shown), which reproduces a visible image from the image signal.

In this embodiment, signals F1, F2, ..., Fn1 fed into the first layer (the input layer) of the neural network shown in FIG. 4 are the image signal components of the preliminary read-out image signal SP representing the picture elements in the X-ray image, which image signal components have been thinned out, and the information representing the read-out conditions for the final readout (i.e. the sensitivity Sk and the latitude Gp), which have been determined automatically in
accordance with predetermined algorithms. The output $y_1^3$ obtained from the third layer (the output layer) is the binary signal representing the correctness or incorrectness of the read-out conditions for the final readout, which have been fed into the neural network.

When a judgment is made manually as to whether the read-out conditions for the final readout, which have been determined automatically in the manner described above, are or are not correct, the preliminary read-out image signal SP, which has been thinned out, and the information representing the read-out conditions for the final readout (i.e. the sensitivity Sk and the latitude Gp) are fed into the neural network shown in FIG. 4. Also, the learning operations of the neural network are carried out in the same manner as that described above.

In this embodiment, the instructor signal $y_1^3$ is the information represent the correctness or incorrectness, which has been entered manually. By carrying out the learning operations, the weights of connections $W_{i,j}^{k,k+1}$ are fixed at final values. Thereafter, when necessary, the learning operations may be continued. When the learning operations are finished, the output $y_1^3$ accurately represents the correctness or incorrectness of the read-out conditions for the final readout, which have been fed into the neural network.

In the aforesaid embodiment of the third radiation image read-out apparatus in accordance with the present invention, the operator displays visible images for all X-ray images and adjusts the read-out conditions for the final readout for the visible images before the learning operations of the neural network are finished. In order for the burden to the operator to be reduced, a temporary judgment may be made for the read-out conditions for the final readout, which have been determined automatically, in accordance with a judgment criterion narrower than the judgment criterion of mean value ± predetermined value. Only when the read-out conditions for the final readout are judged as being incorrect in the temporary judgment, a visible image may be displayed and an adjustment may be carried out for the visible image.

In the aforesaid embodiment of the third radiation image read-out apparatus in accordance with the present invention, the read-out conditions for the final readout are adjusted. Alternatively, predetermined read-out conditions may be used when the final readout is carried out regardless of the characteristics of the preliminary read-out image signal SP. The computer system 40 may adjust the image processing conditions to be used in carrying out image processing of the image signal SQ, and may judge whether the image processing conditions are or are not correct. The computer system 40 may also adjust both the read-out conditions and the image processing conditions and judge whether they are or are not correct.

An embodiment of the fourth radiation image read-out apparatus in accordance with the present invention will be described hereinbelow with reference to FIG. 12. In this embodiment, a stimulable phosphor sheet is used as in the embodiment of the third radiation image read-out apparatus in accordance with the present invention, but no preliminary readout is carried out.

In this embodiment, the read-out means 100' is constituted in the same manner as in the final read-out means 100' shown in FIG. 6. In FIG. 12, similar elements are numbered with the same reference numerals with respect to FIG. 6.

The image signal SQ obtained from the A/D converter 27' is fed into a computer system 40'. In the computer system 40', the image processing conditions, under which the image signal SQ is to be image processed, are determined in the same manner as that in the aforesaid embodiment of the third radiation image read-out apparatus in accordance with the present invention such that a visible image can be obtained which has an appropriate density and an appropriate contrast. The image signal obtained from the image processing is fed into an image reproducing apparatus (not shown), which reproduces a hard copy of the radiation image from the image signal.

In the aforesaid embodiments of the third and fourth radiation image read-out apparatuses in accordance with the present invention, the neural network shown in FIG. 4 is employed which is composed of three layers. However, no limitation is imposed on the number of layers of the neural network. Also, the number of the units $u_i^k$ constituting each layer, the number of input points, the number of output points, or the like, may be set to any of appropriate values. For example, neural networks may be constituted to judge the correctness or incorrectness of the sensitivity and the latitude, respectively.

Also, in the aforesaid embodiments of the third and fourth radiation image read-out apparatuses in accordance with the present invention, stimulable phosphor sheets are used. The third and fourth radiation image read-out apparatuses in accordance with the present invention are also applicable when X-ray film is used.

An embodiment of the fifth radiation image read-out apparatus in accordance with the present invention will be described hereinbelow. In this embodiment, a stimulable phosphor sheet is used.

This embodiment is constituted in the manner shown in FIG. 6. A preliminary read-out image signal SP is obtained from the X-ray image read-out apparatus shown in FIG. 6 by carrying out a preliminary readout of the X-ray image shown in FIG. 10A or FIG. 10B in the same manner as that described above. The preliminary read-out image signal SP is then fed into the computer system 40. The computer system 40 is provided with examples of the operation means, the correction means, and the input means of the fifth radiation image read-out apparatus in accordance with the present invention.

The computer system 40 stores algorithms, which vary for different characteristics of the image and which determine the read-out conditions for the final readout suitable for the characteristics of the image. The computer system 40 also stores information concerning the neural networks having a configuration shown in FIG. 4 (or the coefficients representing the weights of connections of neurons constituting the neural network), which vary for different characteristics of the image and which are used to correct the read-out conditions for the final readout determined with the algorithms. Such characteristics include, for example, the portion of the object the image of which was recorded (e.g. the head, the neck, the chest, or the abdomen), and the orientation in which the object was placed when the image of the object was recorded (e.g. a front image, a right side image, or a left side image). When the preliminary read-out image signal SP is fed into the computer system, the read-out conditions for the final readout, i.e. the sensitivity Sk and the latitude Gp during the final readout, are determined in accordance with the corresponding algorithms in the computer system 40. The sensitivity Sk and the latitude Gp are corrected in the manner described below. The voltage applied to the photomultiplier 21', the amplification factor of the logarithmic amplifier 26', and the like, are controlled in accordance with the corrected sensitivity Sk and the corrected latitude Gp.

When the read-out conditions for the final readout are determined in the manner described above, an image signal is simulated, which will be obtained if a final readout is carried out under the read-out conditions for the final readout, on the basis of the preliminary read-out image signal SP. A visible image is reproduced from the simulated preliminary read-out image signal SP and displayed on the CRT display device 44. By observing the displayed visible image and operating the keyboard 43, the operator adjusts the image density and the contrast of the visible image. The image density and the contrast of the visible image correspond to the sensitivity Sk and the latitude Gp during the final readout. Adjusting the image density and the contrast of the visible image to appropriate levels corresponds to the adjustment of the read-out conditions for the final readout. Correction values for the read-out conditions for the final readout are thereby obtained.

When information representing the completion of the adjustment (or no adjustment) of the image density and the contrast of the visible image is entered from the keyboard 43, the corresponding neural network is read from the memory of the computer system 40. In order for the number of the points of inputs to the neural network to be reduced, the preliminary read-out image signal SP is thinned out uniformly over the whole area of the X-ray image. The learning operations of the neural network are carried out by using the preliminary read-out image signal SP, which has been thinned out, and the information representing the read-out conditions for the final readout, which have been determined automatically, as the input signals and using the information, which is obtained from the adjustment of the visible image and which represents the correction values for the read-out conditions for the final readout, as the instructor signal. After the learning operations of the neural network are repeated a predetermined number of times, information representing accurate correction values for the read-out conditions for the final readout can be fed out. Therefore, even if the radiation image read-out apparatus is operated in a specific manner by the user, correction values appropriate for the user can be obtained. Accordingly, the radiation image read-out apparatus becomes easy to operate.

A stimulable phosphor sheet 11' on which the preliminary readout has been finished is placed at a predetermined position in the final read-out means 100' and scanned with the laser beam 15' having an energy level higher than that of the laser beam 15 used during the preliminary readout. A final readout is carried out under the read-out conditions, which have been determined on the basis of the preliminary read-out image signal SP and corrected by the operator or which have been determined on the basis of the preliminary read-out image signal SP and corrected automatically by the neural network. In this manner, a final read-out image signal SQ is obtained.

After the image signal is digitized in an A/D converter 27', the resulting image signal SQ is fed into the computer system 40, which carries out appropriate image processing on the image signal SQ. After being image processed, the image signal is fed into a reproducing apparatus (not shown), which reproduces a visible image from the image signal.

In this embodiment, signals F1, F2, ..., Fn1 fed into the first layer (the input layer) of the neural network shown in FIG. 4 are the image signal components of the preliminary read-out image signal SP representing the picture elements in the X-ray image, which image signal components have been thinned out, and the information representing the read-out conditions for the final readout (i.e. the sensitivity Sk and the latitude Gp), which have been determined automatically in accordance with predetermined algorithms. The outputs $y_1^3$ and $y_2^3$ obtained from the third layer (the output layer) are the signals representing the correction value $\Delta Sk$ for the sensitivity Sk and the correction value $\Delta Gp$ for the latitude Gp.

When the correction values ($\Delta Sk$ and $\Delta Gp$) for the read-out conditions for the final readout, which have been determined automatically in the manner described above, are obtained manually, the preliminary read-out image signal SP, which has been thinned out, and the information representing the read-out conditions for the final readout (i.e. the sensitivity Sk and the latitude Gp) are fed into the neural network shown in FIG. 4. Also, the learning operations of the neural network are carried out in the same manner as that described above. In this embodiment, the instructor signals $y_1^3$ and $y_2^3$ represent the correction values for the sensitivity and the latitude, respectively, which are appropriate for the image. By carrying out the learning operations, the weights of connections $W_{i,j}^{k,k+1}$ are fixed at final values. Thereafter, when necessary, the learning operations may be continued. When the learning operations are finished, the outputs $y_1^3$ and $y_2^3$ accurately represents the correction values $\Delta Sk$ and $\Delta Gp$ for the sensitivity and the latitude, respectively, as the read-out conditions for the final readout.

By correcting the read-out conditions for the final readout, which have been determined automatically, with the correction values thus obtained, the read-out conditions for the final readout, which are suitable for the user, can be obtained. No limitation is imposed on how the read-out conditions for the final readout are corrected. By way of example, calculations may be carried out with the formula, read-out conditions +correction values, or with the formula, read-out conditions x correction values.

The neural network may feed out information representing the values obtained from the correcting operations (expressed as e.g. read-out conditions +correction values). In such cases, the primary operations of the neural network are calculations of the correction values. Therefore, the fifth radiation image read-out apparatus in accordance with the present invention is meant to embrace such cases within its scopes.

In the aforesaid embodiment of the fifth radiation image read-out apparatus in accordance with the present invention, the read-out conditions for the final readout are adjusted. Alternatively, predetermined read-out conditions may be used when the final readout is carried out regardless of the characteristics of the preliminary read-out image signal SP. The computer system 40 may adjust the image processing conditions to be used in carrying out image processing of the image signal SQ. The image signal SQ may then be image processed under the image processing conditions. The computer system 40 may also determine both the read-out conditions and the image processing conditions.

An embodiment of the sixth radiation image read-out apparatus in accordance with the present invention will be described hereinbelow with reference to FIG. 12. In this embodiment, a stimulable phosphor sheet is used as in the embodiment of the fifth radiation image read-out apparatus in accordance with the present invention, but no preliminary readout is carried out.

In this embodiment, the read-out means 100' is constituted in the same manner as in the final read-out means 100' shown in FIG. 6. In FIG. 12, similar elements are numbered with the same reference numerals with respect to FIG. 6.

The image signal SQ obtained from the A/D converter 27' is fed into a computer system 40'. In the computer system 40', the image processing conditions, under which the image signal SQ is to be image processed, are determined in the same manner as that in the aforesaid embodiment of the fifth radiation image read-out apparatus in accordance with the present invention such that a visible image can be obtained which has an appropriate density and an appropriate contrast. The image signal obtained from the image processing is fed into an image reproducing apparatus (not shown), which reproduces a hard copy of the radiation image from the image signal.

In the aforesaid embodiments of the fifth and sixth radiation image read-out apparatuses in accordance with the present invention, the neural network shown in FIG. 4 is employed which is composed of three layers. However, no limitation is imposed on the number of layers of the neural network. Also, the number of the units $u_j^k$ constituting each layer, the number of input points, the number of output points, or the like, may be set to any of appropriate values.

Also, in the aforesaid embodiments of the fifth and sixth radiation image read-out apparatuses in accordance with the present invention, stimulable phosphor sheets are used. The fifth and sixth radiation image read-out apparatuses in accordance with the present invention are also applicable when X-ray film is used.

We claim:

1. A radiation image processing apparatus, wherein signal processing for determining the shape and location of an irradiation field, adjusting read-out conditions for a final readout from a preliminary read-out image signal, adjusting image processing conditions, and/or detecting an abnormal pattern is carried out on an image signal representing a radiation image by using a neural network, wherein the improvement comprises the provision of an input means for entering modifying information, which is used to modify said signal processing carried out by said neural network and thereby to carry out relearning operations of said neural network, into said neural network after said neural network, the learning operations of which have been carried out, is incorporated into the radiation image processing apparatus.

2. A radiation image processing apparatus as defined in claim 1 wherein said radiation image has been stored on a stimulable phosphor sheet.

3. A radiation image processing apparatus as defined in claim 2 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

4. A radiation image processing apparatus as defined in claim 3 wherein said stimulating rays are a laser beam.

5. A radiation image processing apparatus as defined in claim 1 wherein said radiation image has been recorded on photographic film.

6. An apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a storage means for storing information representing a standard pattern of radiation images, ii) a signal transforming means for transforming said first image signal representing said radiation image into a transformed image signal representing the radiation image, which has been transformed into said standard pattern, iii) a condition adjusting means provided with a neural network, which receives said transformed image signal and feeds out information representing the read-out conditions and/or the image processing conditions, iv) a display means for displaying the radiation image, which has been read out under the read-out conditions fed out of said condition adjusting means and/or image-processed under the image processing conditions fed out of said condition adjusting means, as a visible image, and v) an input means for entering correcting information, which is used to transform said visible image displayed on said display means into a more appropriate visible image, into said condition adjusting means, wherein said condition adjusting means is provided with a learning function for altering operations of said neural network, which receives said transformed image signal and feeds out information representing the read-out conditions and/or the image processing conditions, on the basis of said correcting information received from said input means.

7. An apparatus for adjusting read-out conditions and/or image processing conditions for a radiation image as defined in claim 6 wherein said stimulating rays are a laser beam.

8. An apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a storage means for storing information representing a standard pattern of radiation images, ii) a signal transforming means for transforming said image signal representing said radiation image into a transformed image signal representing the radiation image, which has been transformed into said standard pattern, iii) a condition adjusting means provided with a neural network, which receives said transformed image signal and feeds out information representing the image processing conditions, iv) a display means for displaying the radiation image, which has been image processed under the image processing conditions fed out of said condition adjusting means, as a visible image, and v) an input means for entering correcting information, which is used to transform said visible image displayed on said display means into a more appropriate visible image, into said condition adjusting means, wherein said condition adjusting means is provided with a learning function for altering operations of said neural network, which receives said transformed image signal and feeds out information representing the image processing conditions, on the basis of said correcting information received from said input means.

9. An apparatus for adjusting image processing conditions for a radiation image as defined in claim 8 wherein said radiation image has been stored on a stimulable phosphor sheet.

10. An apparatus for adjusting image processing conditions for a radiation image as defined in claim 9 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

11. An apparatus for adjusting image processing conditions for a radiation image as defined in claim 10 wherein said stimulating rays are a laser beam.

12. An apparatus for adjusting image processing conditions for a radiation image as defined in claim 8 wherein said radiation image has been recorded on photographic film.

13. A radiation image read-out apparatus comprising:

i) a preliminary read-out means for exposing a stimulable phosphor sheet, on which the radiation image has been stored, to stimulating rays, which cause the stimulable phosphor sheet to emit light in proportion to the amount of energy stored thereon during its exposure to radiation, detecting the emitted, and thereby obtaining a preliminary read-out image signal representing said radiation image of said object, ii) a final readout means for again exposing said stimulable phosphor sheet to stimulating rays, which cause said stimulable phosphor sheet to emit light in proportion to the amount of energy stored thereon during its exposure to radiation, detecting the emitted, and thereby obtaining a final read-out image signal representing said radiation image of said object, iii) an operation means provided with a neural network, which receives information based on said preliminary read-out image signal and feeds out information representing read-out conditions, under which said final read-out image signal is to be obtained, and/or image processing conditions, under which said final read-out image signal having been obtained is to be image processed, iv) a condition input means for manually entering information representing read-out conditions and/or image processing conditions, and v) a retraining means for carrying out retraining of said neural network by utilizing the information representing the read-out conditions and/or the image processing conditions, which information has been received from said condition input means, as an instructor signal, and utilizing the information based on said preliminary read-out image signal, which information corresponds to said read-out conditions and/or said image processing conditions, as an input signal.

14. A radiation image read-out apparatus as defined in claim 13 wherein said stimulating rays are a laser beam.

15. A radiation image read-out apparatus comprising:

i) a read-out means for reading out a radiation image of an object from a recording media, on which the radiation image has been recorded, and thereby obtaining an image signal representing said radiation image of said object, ii) an operation means provided with a neural network, which receives information based on said image signal and feeds out information representing image processing conditions, under which said image signal is to be image processed, iii) a condition input means for manually entering information representing image processing conditions, and iv) a retraining means for carrying out retraining of said neural network by utilizing the information representing the image processing conditions, which has been received from said condition input means, as an instructor signal, and utilizing the information based on said image signal, which information corresponds to said image processing conditions, as an input signal.

16. A radiation image read-out apparatus as defined in claim 15 wherein said recording medium is a stimulable phosphor sheet.

17. A radiation image read-out apparatus as defined in claim 16 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

18. A radiation image read-out apparatus as defined in claim 17 wherein said stimulating rays are a laser beam.

19. A radiation image read-out apparatus as defined in claim 15 wherein said recording medium is photographic film.

20. A radiation image read-out apparatus comprising:
i) a preliminary read-out means for exposing a stimulable phosphor sheet, on which the radiation image has been stored, to stimulating rays, which cause the stimulable phosphor sheet to emit light in proportion to the amount of energy stored thereon during its exposure to radiation, detecting the emitted, and thereby obtaining a preliminary read-out image signal representing said radiation image of said object,
ii) a final read-out means for again exposing said stimulable phosphor sheet to stimulating rays, which cause said stimulable phosphor sheet to emit light in proportion to the amount of energy stored thereon during its exposure to radiation, detecting the emitted, and thereby obtaining a final read-out image signal representing said radiation image of said object,
iii) an operation means for determining read-out conditions, under which said final read-out image signal is to be obtained, and/or image processing conditions, under which said final read-out image signal having been obtained is to be image processed, the determination being carried out from said preliminary read-out image signal,
iv) a judgment means for judging whether the read-out conditions and/or the image processing conditions, which have been determined by said operation means, are or are not correct, and
v) an input means for entering information representing the correctness or incorrectness of the read-out conditions and/or the image processing conditions, which have been determined by said operation means,
wherein said judgment means is provided with a neural network, which receives information based on said preliminary read-out image signal and information representing the read-out conditions and/or the image processing conditions determined by said operation means, feeds out information representing the results of the judgment as to whether the read-out conditions and/or the image processing conditions determined by said operation means are or are not correct, and utilizes the information representing the correctness or incorrectness of the read-out conditions and/or the image processing conditions, the information having been received from said input means, as an instructor signal.

21. A radiation image read-out apparatus as defined in claim 20 wherein said stimulating rays are a laser beam.

22. A radiation image read-out apparatus comprising:
i) a read-out means for reading out a radiation image of an object from a recording media, on which the radiation image has been recorded, and thereby obtaining an image signal representing said radiation image of said object,
ii) an operation means for determining image processing conditions, under which said image signal is to be image processed, from said image signal,
iii) a judgment means for judging whether the image processing conditions, which have been determined by said operation means, are or are not correct, and
iv) an input means for entering information representing the correctness or incorrectness of the image processing conditions, which have been determined by said operation means,
wherein said judgment means is provided with a neural network, which receives information based on said image signal and information representing the image processing conditions determined by said operation means, feeds out information representing the results of the judgment as to whether the image processing conditions determined by said operation means are or are not correct, and utilizes the information representing the correctness or incorrectness of the image processing conditions, the information having been received from said input means, as an instructor signal.

23. A radiation image read-out apparatus as defined in claim 22 wherein said recording medium is a stimulable phosphor sheet.

24. A radiation image read-out apparatus as defined in claim 23 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

25. A radiation image read-out apparatus as defined in claim 24 wherein said stimulating rays are a laser beam.

26. A radiation image read-out apparatus as defined in claim 22 wherein said recording medium is photographic film.

27. A radiation image read-out apparatus comprising:
i) a preliminary read-out means for exposing a stimulable phosphor sheet, on which the radiation image has been stored, to stimulating rays, which cause the stimulable phosphor sheet to emit light in proportion to the amount of energy stored thereon during its exposure to radiation, detecting the emitted, and thereby obtaining a preliminary read-out image signal representing said radiation image of said object,
ii) a final read-out means for again exposing said stimulable phosphor sheet to stimulating rays, which cause said stimulable phosphor sheet to emit light in proportion to the amount of energy stored thereon during its exposure to radiation, detecting the emitted, and thereby obtaining a final read-out image signal representing said radiation image of said object, iii) an operation means for determining read-out conditions, under which said final read-out image signal is to be obtained, and/or image processing conditions, under which said final read-out image signal having been obtained is to be image processed, the determination being carried out from said preliminary read-out image signal, iv) a correction means for calculating correction values for the read-out conditions and/or the image processing conditions, which have been determined by said operation means, and v) an input means for entering information representing the correction values for the read-out conditions and/or the image processing conditions, wherein said correction means is provided with a neural network, which receives information based on said preliminary read-out image signal and information representing the read-out conditions and/or the image processing conditions determined by said operation means, feeds out information representing the correction values for the read-out conditions and/or the image processing conditions determined by said operation means, and utilizes the information representing the correction values, the information having been received from said input means, as an instructor signal.

28. A radiation image read-out apparatus as defined in claim 27 wherein said stimulating rays are a laser beam.

29. A radiation image read-out apparatus comprising:
i) a read-out means for reading out a radiation image of an object from a recording media, on which the radiation image has been recorded, and thereby obtaining an image signal representing said radiation image of said object, ii) an operation means for determining image processing conditions, under which said image signal is to be image processed, from said image signal, iii) a correction means for calculating correction values for the image processing conditions, which have been determined by said operation means, and iv) an input means for entering information representing the correction values for the image processing conditions, wherein said correction means is provided with a neural network, which receives information based on said image signal and information representing the image processing conditions determined by said operation means, feeds out information representing the correction values for the image processing conditions determined by said operation means, and utilizes the information representing the correction values, the information having been received from said input means, as an instructor signal.

30. A radiation image read-out apparatus as defined in claim 29 wherein said recording medium is a stimulable phosphor sheet.

31. A radiation image read-out apparatus as defined in claim 30 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

32. A radiation image read-out apparatus as defined in claim 31 wherein said stimulating rays are a laser beam.

33. A radiation image read-out apparatus as defined in claim 29 wherein said recording medium is photographic film.

* * * * *